(12) United States Patent
Guan et al.

(10) Patent No.: US 11,463,150 B2
(45) Date of Patent: Oct. 4, 2022

(54) DATA TRANSMISSION METHOD, DEVICE, AND COMPUTER-READABLE STORAGE MEDIUM

(71) Applicant: Huawei Technologies Co., Ltd., Shenzhen (CN)

(72) Inventors: Peng Guan, Chengdu (CN); Lei Chen, Chengdu (CN); Shitong Yuan, Chengdu (CN); Xi Zhang, Ottawa (CA); Di Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 17/095,506

(22) Filed: Nov. 11, 2020

(65) Prior Publication Data
US 2021/0067234 A1 Mar. 4, 2021

Related U.S. Application Data

(63) Continuation of application No. PCT/CN2019/081802, filed on Apr. 8, 2019.

(30) Foreign Application Priority Data

May 11, 2018 (CN) .......................... 201810451394.0

(51) Int. Cl.
*H04W 24/08* (2009.01)
*H04B 7/08* (2006.01)
*H04W 76/19* (2018.01)

(52) U.S. Cl.
CPC ............ *H04B 7/088* (2013.01); *H04W 24/08* (2013.01); *H04W 76/19* (2018.02)

(58) Field of Classification Search
CPC .... H04B 7/088; H04B 7/0695; H04B 7/0602; H04W 24/08; H04W 24/04;
(Continued)

(56) References Cited

U.S. PATENT DOCUMENTS 10,194,442 B2 * 1/2019 Nagaraja .............. H04B 7/0695
2008/0218413 A1 9/2008 Li et al.
(Continued)

FOREIGN PATENT DOCUMENTS

CN 101601317 A 12/2009
CN 106572017 A 4/2017

OTHER PUBLICATIONS

"Summary 1 on Remaing issues on Beam Failure Recovery," 3GPP TSG RAN WG1 Meeting #92bis, Sanya, China, R1-1805563, pp. 1-14, 3rd Generation Partnership Project, Valbonne, Frane (Apr. 16-20, 2018).
(Continued)

Primary Examiner — Tejis Daya
Assistant Examiner — H. R.
(74) Attorney, Agent, or Firm — Leydig, Voit & Mayer, Ltd.

(57) ABSTRACT

This application provides a communication method and a communications apparatus. The method includes: in a process in which a terminal device performs beam failure recovery in a first bandwidth, determining, by the terminal device, that an operating bandwidth needs to be switched from the first bandwidth to a second bandwidth; and switching, by the terminal device, from the first bandwidth to the second bandwidth according to a preset policy. According to embodiments of this application, the operating bandwidth can be switched in the beam failure recovery process.

16 Claims, 10 Drawing Sheets

(58) Field of Classification Search
CPC ........... H04W 72/046; H04W 72/0453; H04W 72/0493; H04W 76/19; H04W 36/0016
See application file for complete search history.

(56) References Cited

U.S. PATENT DOCUMENTS

| | | | |
|---|---|---|---|
| 2017/0302355 | A1 | 10/2017 | Islam et al. |
| 2017/0303264 | A1 | 10/2017 | Islam et al. |
| 2018/0234960 | A1* | 8/2018 | Nagaraja ............. H04W 72/046 |
| 2019/0089579 | A1* | 3/2019 | Sang .................... H04W 76/27 |
| 2019/0098655 | A1* | 3/2019 | Shih ..................... H04L 5/0048 |
| 2019/0166555 | A1* | 5/2019 | Cheng .................. H04B 7/0695 |
| 2019/0306867 | A1* | 10/2019 | Cirik ................. H04W 74/0833 |
| 2019/0319833 | A1* | 10/2019 | Nagaraja ............. H04W 72/085 |
| 2020/0389222 | A1* | 12/2020 | Wu ....................... H04L 5/0023 |
| 2021/0013950 | A1* | 1/2021 | Yang ................. H04W 74/0833 |

OTHER PUBLICATIONS

"WF on remaining issues for beam failure recovery," 3GPP TSG RAN WG1 Meeting #92bis, Sanya, China, R1-1805565, pp. 1-7, 3rd Generation Partnership Project, Valbonne, Frane (Apr. 16-20, 2018).

Vivo, "Discussion on the impact on beam failure recovery," 3GPP TSG-RAN WG2 Meeting #101, Athens, Greece, R2-1802006, total 4 pages, 3rd Generation Partnership Project, Valbonne, France (Feb. 26-Mar. 2, 2018).

MediaTek Inc., "Summary 3 on Remaing issues on Beam Failure Recovery," 3GPP TSG RAN WG1 Meeting #92bis, Sanya, China, R1-1805730, total 25 pages, 3rd Generation Partnership Project, Valbonne, France (Apr. 16-20, 2018).

CATT, "Corrections for BFR support," 3GPP TSG-RAN WG2#101bis, Sanya, China, R2-1804514, total 9 pages, 3rd Generation Partnership Project, Valbonne, France (Apr. 16-20, 2018).

MediaTek Inc., Qualcomm Incorporated, "RLM/RLF Considering Beam Failure Recovery," 3GPP TSG-RAN WG2 Meeting AH-1801, Vancouver, Canada, R2-1800646 (Revision of R2-1710881), total 6 pages, 3rd Generation Partnership Project, Valbonne, France (Jan. 22-26, 2018).

* cited by examiner

DATA TRANSMISSION METHOD, DEVICE, AND COMPUTER-READABLE STORAGE MEDIUM

CROSS-REFERENCE TO RELATED APPLICATIONS

This application is a continuation of International Application No. PCT/CN2019/081802, filed on Apr. 8, 2019, which claims priority to Chinese Patent Application No. 201810451394.0, filed on May 11, 2018. The disclosures of the aforementioned applications are hereby incorporated by reference in their entireties.

TECHNICAL FIELD

This application relates to the communications field, and in particular, to a communication method and a communications apparatus.

BACKGROUND

In a 5th-generation (5G) mobile communications system, low-frequency (for example, a frequency lower than 6 GHz) communication cannot meet increasing communication requirements. Therefore, high-frequency (for example, a frequency higher than 6 GHz) (HF) communication is gaining increasing attention in both the academic and industry sectors.

However, because energy of an HF signal attenuates quickly in space, the HF signal has a weak penetration capability, and a signal path loss of the HF signal is far greater than that of a low-frequency signal, gains on an antenna side need to be used to compensate for this loss, to ensure coverage of an HF system. In addition, because of a shorter signal wavelength and a smaller antenna size in an HF scenario, a massive multiple-input-multiple-output (Massive-MIMO) technology is also more suitable for application in the HF scenario. Through the massive-MIMO technology, a transmit beam with more concentrated energy may be formed on a transmit side such as a network device side in a digital and/or analog manner to ensure system coverage, and a receive beam with more concentrated energy may also be formed on a receive side such as a terminal device side to increase a receive gain.

Beam-based communication can bring a higher antenna gain, and can overcome a problem of fast attenuation of the high-frequency signal. However, beam-based communication may cause signal interruption due to blocking or other reasons. In an existing protocol, a network device (for example, a base station) and a terminal device may resolve a problem of signal interruption by performing beam failure recovery.

However, beam failure recovery in the existing protocol is performed when an operating bandwidth of the terminal device is fixed, and impact, on beam failure recovery, of switching of the operating bandwidth of the terminal device is not considered in the prior art.

Therefore, in a process in which the terminal device performs beam failure recovery in the operating bandwidth, how to switch the operating bandwidth becomes an urgent problem to be resolved.

SUMMARY

This application provides a communication method and a communications apparatus, to switch an operating bandwidth in a beam failure recovery process.

According to a first aspect, a communication method is provided. The method includes: in a process in which a terminal device performs beam failure recovery in a first bandwidth, determining, by the terminal device, that an operating bandwidth needs to be switched from the first bandwidth to a second bandwidth; and switching, by the terminal device, from the first bandwidth to the second bandwidth according to a preset policy.

Therefore, this embodiment of this application provides a solution of switching the operating bandwidth in the process of performing beam failure recovery in the operating bandwidth, thereby resolving a problem in the prior art.

With reference to the first aspect, in an implementation of the first aspect, the determining, by the terminal device, that an operating bandwidth needs to be switched from the first bandwidth to a second bandwidth includes:

determining, by the terminal device based on bandwidth switching indication information received in the process of performing beam failure recovery in the first bandwidth, that the operating bandwidth is switched from the first bandwidth to the second bandwidth.

With reference to the first aspect, in an implementation of the first aspect, the determining, by the terminal device, that an operating bandwidth needs to be switched from the first bandwidth to a second bandwidth includes:

determining, by the terminal device based on pre-obtained bandwidth switching indication information, that the operating bandwidth needs to be switched from the first bandwidth to the second bandwidth in the process of performing beam failure recovery in the first bandwidth.

With reference to the first aspect, in an implementation of the first aspect, the switching, by the terminal device, from the first bandwidth to the second bandwidth according to a preset policy includes:

switching, by the terminal device, from the first bandwidth to the second bandwidth after performing the process of beam failure recovery in the first bandwidth.

Therefore, in this embodiment of this application, beam failure recovery is first performed in the first bandwidth, and after the beam failure recovery, normal communication between the terminal device and a network device can be ensured, thereby ensuring service continuity.

Alternatively, the switching, by the terminal device, from the first bandwidth to the second bandwidth according to a preset policy includes:

stopping, by the terminal device, the process of beam failure recovery in the first bandwidth, and switching from the first bandwidth to the second bandwidth.

Specifically, because the operating bandwidth of the terminal device needs to be switched, and the operating bandwidth is no longer the first bandwidth, in this embodiment of this application, when the operating bandwidth needs to be switched from the first bandwidth to the second bandwidth, the process of beam failure recovery in the first bandwidth may be stopped, and the first bandwidth is switched to the second bandwidth. After the operating bandwidth is switched, the terminal device may re-evaluate and re-detect quality of a serving beam in the second bandwidth according to an existing method.

With reference to the first aspect, in an implementation of the first aspect, the switching, by the terminal device, from the first bandwidth to the second bandwidth according to a preset policy includes:

switching, by the terminal device, from the first bandwidth to the second bandwidth based on configurations of control channels of the first bandwidth and the second bandwidth.

With reference to the first aspect, in an implementation of the first aspect, the switching, by the terminal device, from the first bandwidth to the second bandwidth based on configurations of control channels of the first bandwidth and the second bandwidth includes:

when the configurations of the control channels of the first bandwidth and the second bandwidth are different, stopping, by the terminal device, the process of beam failure recovery in the first bandwidth, and switching from the first bandwidth to the second bandwidth.

Specifically, although beam failure recovery needs to be performed in the first bandwidth, that is, beam quality in the first bandwidth is relatively poor, because the configurations of the control channels of the first bandwidth and the second bandwidth are different, and beam quality in the second bandwidth has no association relationship with the first bandwidth, the beam quality in the second bandwidth may be relatively good. In other words, that a beam in bandwidth part #x (BWP #x) cannot be used does not mean that a beam in BWP #y cannot be used. Therefore, after switching to BWP #y, UE may re-evaluate the quality of the serving beam. Therefore, when the operating bandwidth needs to be switched from the first bandwidth to the second bandwidth, in this embodiment of this application, the process of beam failure recovery in the first bandwidth may not be considered. The process of beam failure recovery in the first bandwidth is directly stopped, and the operating bandwidth is switched from the first bandwidth to the second bandwidth.

Alternatively: when the configurations of the control channels of the first bandwidth and the second bandwidth are the same, switching, by the terminal device, from the first bandwidth to the second bandwidth; and continuing, by the terminal device, to perform, in the second bandwidth, the process of beam failure recovery in the first bandwidth.

Specifically, beam failure recovery needs to be performed in the first bandwidth, that is, beam quality in the first bandwidth is relatively poor, because the configurations of the control channels of the first bandwidth and the second bandwidth are the same, beam quality in the second bandwidth is similar to the beam quality in the first bandwidth. Therefore, after the operating bandwidth is switched to the second bandwidth, beam failure recovery also needs to be performed. Therefore, in this embodiment of this application, after switching from the first bandwidth to the second bandwidth, the terminal device directly continues to perform, in the second bandwidth, the process of beam failure recovery in the first bandwidth, so that a part of the process of beam failure recovery that has been completed in the first bandwidth can be avoided from being performed again in the second bandwidth, and a beam failure recovery time in the second bandwidth is reduced.

With reference to the first aspect, in an implementation of the first aspect, that the configurations of the control channels of the first bandwidth and the second bandwidth are the same means that beams of the control channels of the first bandwidth and the second bandwidth are the same.

With reference to the first aspect, in an implementation of the first aspect, after detecting one beam failure instance (BFI) in the first bandwidth, the terminal device determines that the operating bandwidth needs to be switched from the first bandwidth to the second bandwidth; and the continuing, by the terminal device, to perform, in the second bandwidth, the process of beam failure recovery in the first bandwidth includes:

maintaining, by the terminal device, an overall time window for beam failure recovery in the first bandwidth, and a first counter and/or a first time window for determining a beam failure, and continuing to perform a process of beam failure detection in the second bandwidth.

With reference to the first aspect, in an implementation of the first aspect, after detecting a beam failure in the first bandwidth, the terminal device determines that the operating bandwidth needs to be switched from the first bandwidth to the second bandwidth; and the continuing, by the terminal device, to perform, in the second bandwidth, the process of beam failure recovery in the first bandwidth includes:

maintaining, by the terminal device, an overall time window for beam failure recovery in the first bandwidth, and performing at least one of the following actions:

starting to perform a process of discovering an available candidate beam in the second bandwidth;

sending a beam failure recovery request; or monitoring a process in which a network device responds to the beam failure recovery request.

With reference to the first aspect, in an implementation of the first aspect, a failed beam in the first bandwidth is an available beam in the second bandwidth; and the starting to perform a process of discovering an available candidate beam in the second bandwidth includes:

performing, by the terminal device, the process of discovering an available candidate beam in a first subset of a candidate beam set in the second bandwidth, where the first subset includes a beam other than the failed beam in the candidate beam set in the second bandwidth.

With reference to the first aspect, in an implementation of the first aspect, after determining an available beam in the first bandwidth, the terminal device determines that the operating bandwidth needs to be switched from the first bandwidth to the second bandwidth; and the continuing, by the terminal device, to perform, in the second bandwidth, the process of beam failure recovery in the first bandwidth includes: maintaining, by the terminal device, an overall time window for beam failure recovery in the first bandwidth, and performing at least one of the following actions:

sending, by the terminal device based on the available beam in the first bandwidth, a beam recovery request, and monitoring a response of a network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

With reference to the first aspect, in an implementation of the first aspect, after sending a beam failure recovery request (BFRQ) in the first bandwidth, the terminal device determines that the operating bandwidth needs to be switched from the first bandwidth to the second bandwidth; and the continuing, by the terminal device, to perform, in the second bandwidth, the process of beam failure recovery in the first bandwidth includes:

maintaining, by the terminal device, an overall time window for beam failure recovery in the first bandwidth and a counter for determining a quantity of BFRQ retransmissions, and performing at least one of the following actions:

sending, by the terminal device based on an available beam in the first bandwidth, a beam recovery request, and monitoring a response of a network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

With reference to the first aspect, in an implementation of the first aspect, after starting to detect a response to a BFRQ in the first bandwidth, the terminal device determines that the operating bandwidth needs to be switched from the first bandwidth to the second bandwidth; and the continuing, by the terminal device, to perform, in the second bandwidth, the process of beam failure recovery in the first bandwidth includes:

maintaining, by the terminal device, an overall time window for beam failure recovery in the first bandwidth and a counter for determining a quantity of BFRQ retransmissions, and performing at least one of the following actions:

monitoring, by the terminal device based on an available beam in the first bandwidth, a response of a network device to the beam failure recovery request;

sending, by the terminal device based on the available beam in the first bandwidth, a beam recovery request, and monitoring the response of the network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

With reference to the first aspect, in an implementation of the first aspect, the available beam in the second bandwidth is the same as the available beam in the first bandwidth; or the available beam in the second bandwidth and the available beam in the first bandwidth satisfy a quasi-colocation (QCL) relationship; or the available beam in the second bandwidth is obtained by the terminal device through measurement in the second bandwidth.

With reference to the first aspect, in an implementation of the first aspect, the method further includes:

obtaining, by the terminal device, configuration information, where the configuration information is used to configure at least one of the following information:

a QCL relationship between a downlink signal and a synchronization signal/broadcast channel block SSB that are cross-bandwidth;

a configuration in which candidate beams in one bandwidth include beams in a plurality of bandwidths;

an association relationship between cross-bandwidth reference signals;

an association relationship between an uplink resource and a reference signal of a candidate beam that are cross-bandwidth;

an association relationship between cross-bandwidth uplink and downlink beams; and an association relationship between uplink and downlink bandwidths.

According to a second aspect, a communication method is provided. The method includes:

generating, by a network device, configuration information, where the configuration information is used by a terminal device to perform operating bandwidth switching and/or beam failure recovery; and sending, by the network device, the configuration information, where the configuration information is used to configure at least one of the following information:

a QCL relationship between a downlink signal and a synchronization signal/broadcast channel block SSB that are cross-bandwidth;

a configuration in which candidate beams in one bandwidth include beams in a plurality of bandwidths;

an association relationship between cross-bandwidth reference signals;

an association relationship between an uplink resource and a reference signal of a candidate beam that are cross-bandwidth;

an association relationship between cross-bandwidth uplink and downlink beams; and an association relationship between uplink and downlink bandwidths.

In this embodiment of this application, the network device sends the configuration information to the terminal device, so that the terminal device switches, based on the configuration information, the operating bandwidth in the process of performing beam failure recovery in the operating bandwidth, thereby resolving a problem in the prior art.

According to a third aspect, a communication method is provided. The method includes:

switching, by a terminal device, an operating bandwidth from a first bandwidth to a second bandwidth; and performing, by the terminal device, beam failure recovery detection in the second bandwidth by using a synchronization signal/broadcast channel block (SSB).

With reference to the third aspect, in an implementation of the third aspect, the SSB is carried in the second bandwidth, and the SSB and a DLRS in the second bandwidth satisfy a QCL relationship.

With reference to the third aspect, in an implementation of the third aspect, the SSB is carried in a third bandwidth, and the SSB and the DLRS in the second bandwidth satisfy a QCL relationship.

With reference to the third aspect, in an implementation of the third aspect, the third bandwidth is a predefined bandwidth, a bandwidth with a preset label, or a bandwidth with a preset ID.

With reference to the third aspect, in an implementation of the third aspect, the method further includes:

obtaining, by the terminal device, configuration information, where the configuration information is used to configure the SSB and the DLRS in the second bandwidth to satisfy the QCL relationship.

Therefore, in this embodiment of this application, the second bandwidth is measured by using the SSB, thereby resolving a problem that there is no reference signal used for beam detection in the second bandwidth.

According to a fourth aspect, a communication method is provided, including:

determining, by a terminal device, that no available beam exists in a first bandwidth;

switching, by the terminal device, an operating bandwidth from the first bandwidth to a second bandwidth; and detecting, by the terminal device, an available beam in the second bandwidth.

With reference to the fourth aspect, in an implementation of the fourth aspect, the method further includes:

obtaining, by the terminal device, configuration information, where the configuration information is used to configure that candidate beams of the first bandwidth include a beam of the first bandwidth and a beam of the second bandwidth.

Therefore, in this embodiment of this application, an available beam is discovered by checking beams of a plurality of bandwidths, so that a probability of discovering the available beam can be increased.

According to a fifth aspect, a communication method is provided, including:

detecting, by a terminal device, an available beam (a downlink beam) in a first bandwidth; and sending, by the terminal device, a BFRQ by using a random access channel (RACH) resource of a fourth bandwidth.

With reference to the fifth aspect, in an implementation of the fifth aspect, the fourth bandwidth is a predefined bandwidth, a bandwidth with a preset label, or a bandwidth with a preset ID.

With reference to the fifth aspect, in an implementation of the fifth aspect, the method further includes:

obtaining, by the terminal device, configuration information, where the configuration information is used to configure an association relationship between a reference signal RS of the first bandwidth and the RACH resource.

With reference to the fifth aspect, in an implementation of the fifth aspect, the configuration information is further used to configure a QCL relationship between the RS in the first bandwidth and an RS in the fourth bandwidth.

With reference to the fifth aspect, in an implementation of the fifth aspect, the available beam in the first bandwidth is a downlink beam.

The configuration information is further used to configure an association relationship between the downlink beam of the first bandwidth and an uplink beam of the fourth bandwidth.

With reference to the fifth aspect, in an implementation of the fifth aspect, the method further includes:

receiving, by the terminal device by using a downlink beam of the fourth bandwidth, a response to a BFRQ transmitted by using a physical downlink control channel (PDCCH) resource.

Therefore, in this embodiment of this application, a problem that the beam failure recovery request cannot be sent because there is no uplink resource in a current bandwidth can be avoided by sending the BFRQ in another bandwidth.

According to a sixth aspect, a communication method is provided, including:

performing, by a terminal device, beam failure detection in a downlink bandwidth of a bandwidth pair, and detecting an available beam; and sending, by the terminal device, a BFRQ by using an uplink bandwidth of the bandwidth pair, and detecting a response to the BFRQ in the downlink bandwidth, where each bandwidth pair includes the uplink bandwidth and the downlink bandwidth.

With reference to the sixth aspect, in an implementation of the sixth aspect, the method further includes:

obtaining, by the terminal device, configuration information, where the configuration information is used to configure the bandwidth pair.

Specifically, in this embodiment of this application, a BWP pair is configured by a network device or predefined by a protocol, and each BWP pair includes a corresponding uplink BWP and a corresponding downlink BWP. Specifically, in a process of beam failure recovery, a BFD RS, a candidate beam RS, and a response of a base station to the BFRQ are detected by using the downlink BWP in the BWP pair, and the BFRQ is sent by using the uplink BWP. In this manner, a problem of mismatch between the uplink BWP and the downlink BWP can be resolved.

According to a seventh aspect, a communications apparatus is provided, including modules or units configured to perform the method according to the first aspect and the third aspect to the sixth aspect or any one of the possible implementations of the first aspect and the third aspect to the sixth aspect.

In an implementation, the communications apparatus is a terminal device.

According to an eighth aspect, a communications apparatus is provided, including modules or units configured to perform the method according to the second aspect or any one of the possible implementations of the second aspect.

In an implementation, the communications apparatus is a network device.

According to a ninth aspect, a communications apparatus is provided, including a transceiver, a processor, and a memory. The processor is configured to control the transceiver to receive and send a signal, the memory is configured to store a computer program, and the processor is configured to invoke the computer program from the memory and run the computer program, so that the network device is enabled to perform the method according to the first aspect and the third aspect to the sixth aspect or any one of the possible implementations of the first aspect and the third aspect to the sixth aspect.

In an implementation, the communications apparatus is a terminal device.

According to a tenth aspect, a communications apparatus is provided, including a transceiver, a processor, and a memory. The processor is configured to control the transceiver to receive and send a signal, the memory is configured to store a computer program, and the processor is configured to invoke the computer program from the memory and run the computer program, so that the terminal device is enabled to perform the method according to the second aspect or the possible implementations of the second aspect.

In an implementation, the communications apparatus is a network device.

According to an eleventh aspect, a computer-readable medium is provided. The computer-readable medium stores a computer program. When the computer program is executed by a computer, the method according to the first aspect and the third aspect to the sixth aspect or any one of the possible implementations of the first aspect and the third aspect to the sixth aspect is implemented.

According to a twelfth aspect, a computer-readable medium is provided. The computer-readable medium stores a computer program. When the computer program is executed by a computer, the method according to the second aspect or any one of the possible implementations of the second aspect is implemented.

According to a thirteenth aspect, a computer program product is provided. When the computer program product is executed by a computer, the method according to the first aspect and the third aspect to the sixth aspect or any one of the possible implementations of the first aspect and the third aspect to the sixth aspect is implemented.

According to a fourteenth aspect, a computer program product is provided. When the computer program product is executed by a computer, the method according to the second aspect or any one of the possible implementations of the second aspect is implemented.

According to a fifteenth aspect, a processing apparatus is provided, including a processor.

In an implementation, the method according to the first aspect to the sixth aspect or any one of the possible implementations of the first aspect to the sixth aspect is performed by the processor. In this case, the processor may be a dedicated processor.

In another implementation, the processing apparatus may further include a memory. The memory stores code, and the processor executes the code in the memory to perform the method according to the first aspect to the sixth aspect or any one of the possible implementations of the first aspect to the sixth aspect. In this case, the processor may be a general-purpose processor.

It should be understood that a related data exchange process in the fifteenth aspect, for example, sending data, may be a process of outputting data from the processor, and receiving data may be a process of receiving input data by the processor. Specifically, the data output by the processor may be output to a transmitter, and the input data received by the processor may be from a receiver. The transmitter and the receiver may be collectively referred to as a transceiver.

The processing apparatus according to the fifteenth aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, may be located outside the processor, and may exist independently.

According to a sixteenth aspect, a system is provided, including the foregoing network device and the terminal device.

DESCRIPTION OF EMBODIMENTS

Figure 1:
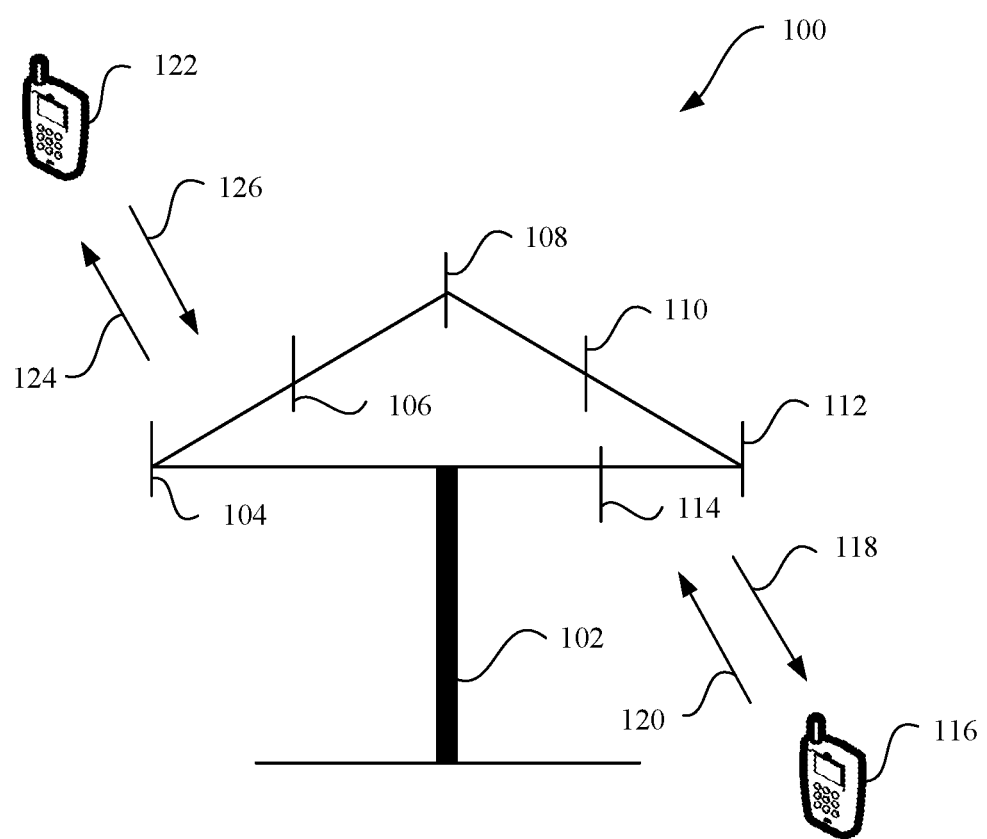
FIG. 1 is a schematic diagram of a scenario to which an embodiment of this application is applicable.

The following describes technical solutions of this application with reference to accompanying drawings.

Embodiments of this application may be applied to various communications systems. Therefore, the following descriptions are not limited to a particular communications system. A next-generation communications system is a 5th generation (5G) communications system, such as a new radio (NR) system.

In the embodiments of this application, a network device may be a network side device in a 5G network, for example, a transmission point (TRP or TP) in an NR system, a gNB in an NR system, a radio frequency unit such as a remote radio unit in an NR system, or one antenna panel or a group of antenna panels (including a plurality of antenna panels) of a base station in a 5G system. Different network devices may be located in a same cell, or may be located in different cells. This is not specifically limited herein.

In some deployments, the gNB may include a centralized unit (CU) and a distributed unit (DU). The gNB may further include a radio frequency unit (RFU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, or a terminal device in a future evolved public land mobile network (PLMN). This is not limited in the embodiments of this application.

By way of example and not limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on the body or that is integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

The embodiments of this application may be applied to any one of the foregoing communications systems. For example, the embodiments of this application may be applied to an LTE system and a subsequent evolved system such as 5G, or other wireless communications systems using various radio access technologies, for example, a system using an access technology such as code division multiple access, frequency division multiple access, time division multiple access, orthogonal frequency division multiple access, or single-carrier frequency division multiple access, especially applicable to a scenario in which a channel information feedback is required and/or a two-stage precoding technology is applied, for example, a wireless network to which a massive array antenna (massive MIMO) technology is applied, or a wireless network to which a distributed antenna technology is applied.

FIG. 1 is a schematic diagram of a scenario of a communications system to which an embodiment of this application is applicable. As shown in FIG. 1, a communications system 100 includes a network side device 102 and a plurality of terminal devices (such as a terminal device 116 and a terminal device 122). The network device 102 may provide a communications service for the terminal device and access a core network. The terminal device accesses a network by searching for a synchronization signal, a broadcast signal, or the like that is sent by the network device, to communicate with the network, for example, perform uplink/downlink transmission.

Specifically, the network side device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network side device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (such as a terminal device 116 and a terminal device 122). However, it may be understood that the network side device 102 may communicate with any quantity of terminal devices similar to the terminal device 116 or 122.

As shown in FIG. 1, the terminal device 116 communicates with the antennas 112 and 114. The antennas 112 and 114 send information to the terminal device 116 by using a forward link 116, and receive information from the terminal device 116 by using a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, for example, the forward link 116 may use a frequency band different from that used by the reverse link 120, and the forward link 124 may use a frequency band different from that used by the reverse link 126.

For another example, in a time division duplex (TDD) system and a full duplex (full duplex) system, the forward link 116 and the reverse link 120 may use a same frequency band, and the forward link 124 and the reverse link 126 may use a same frequency band.

Each antenna group and/or region designed for communication is referred to as a sector of the network side device 102. For example, an antenna group may be designed to communicate with a terminal device in the sector within coverage of the network side device 102. In a process in which the network side device 102 communicates with the terminal devices 116 and 122 by using the forward links 116 and 124 respectively, a transmit antenna of the network side device 102 may increase signal-to-noise ratios of the forward links 116 and 124 through beamforming. In addition, compared with a manner in which the network side device sends signals to all terminal devices of the network side device by using a single antenna, when the network side device 102 sends, through beamforming, signals to the terminal devices 116 and 122 that are randomly distributed in related coverage, a mobile device in a neighboring cell is subject to relatively less interference.

At a given time, the network side device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits to be sent to the wireless communications receiving apparatus over a channel. The data bits may be included in a transport block (or a plurality of transport blocks) of the data, and the transport block may be segmented to generate a plurality of code blocks.

In addition, the communications system 100 may be a public land mobile network PLMN, a device-to-device (D2D) network, a machine-to-machine (M2M) network, or another network. FIG. 1 is merely an example of a simplified schematic diagram for ease of understanding, and the network may further include another network device that is not shown in FIG. 1.

As described above, beam failure recovery in the existing protocol is performed when an operating bandwidth of the terminal device is fixed, and impact, on beam failure recovery, of switching of the operating bandwidth is not considered in the prior art. Therefore, in the prior art, in a process in which the terminal device performs beam failure recovery in the operating bandwidth, how to switch the operating bandwidth cannot be determined.

In view of the foregoing problem, the embodiments of this application provide a solution of how the terminal device switches the operating bandwidth in the process of beam failure recovery.

Specifically, in the embodiments of this application, in the process in which the terminal device performs beam failure recovery in a first bandwidth, the terminal device determines that the operating bandwidth needs to be switched from the first bandwidth to a second bandwidth; and the terminal device switches from the first bandwidth to the second bandwidth according to a preset policy. Therefore, the embodiments of this application provide a solution of how to switch the operating bandwidth in the process of performing beam failure recovery in the operating bandwidth, thereby resolving a problem in the prior art.

For ease of understanding and description, by way of example and not limitation, the following describes an execution process and an execution action in a communication method in a communications system in this application.

First, to make the method in the embodiments of this application easier to understand, some concepts in the embodiments of this application are described below.

The QCL relationship is used to indicate that a plurality of resources have one or more same or similar communication features. For the plurality of resources that have the QCL relationship, a same or similar communication configuration may be used. For example, if two antenna ports have the QCL relationship, a large-scale channel property in which one port transmits a symbol may be inferred from a large-scale channel property in which the other port transmits a symbol. The large-scale property may include delay spread, an average delay, Doppler spread, Doppler frequency shift, an average gain, a receive parameter, a receive beam number of the terminal device, transmit/receive channel correlation, an angle of arrival, spatial correlation of a receiver antenna, a dominant angle of arrival (AoA), an average angle of arrival, AoA spread, and the like. In this embodiment of this application, the network device may indicate the QCL relationship by using a quasi-co-location indication. Specifically, the quasi-co-location indication may be used to indicate whether at least two groups of antenna ports have the quasi-co-location relationship; or the quasi-co-location indication is used to indicate whether channel state information reference signals sent by the at least two groups of antenna ports are from a same transmission point; or the quasi-co-location indication is used to indicate whether channel state information reference signals sent by the at least two groups of antenna ports are from a same beam group, and so on.

In the embodiments of this application, a beam may also be referred to as a spatial domain transmission filter, a transmit beam may also be referred to as a spatial domain transmit filter, and a receive beam may also be referred to as a spatial domain receive filter.

Beam indication information includes at least one of a beam number, a downlink signal resource number, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, and an index of a transmit codebook corresponding to a beam. The downlink signal includes any one of a channel state information reference signal (CSI-RS), a cell-specific reference signal (CS-RS), and a UE-specific reference signal (US-RS). Optionally, the network device may further allocate a QCL (quasi-co-location) identifier to beams that have a QCL relationship and that are in beams associated with a frequency resource group.

Specifically, in the embodiments of this application, the beam may be considered as a communication resource. The beam in the embodiments of this application may be a wide beam, a narrow beam, or a beam of another type. A technology for forming a beam in this embodiment of this application may be a beamforming technology or another technical means. The beamforming technology may be specifically a digital beamforming technology, an analog beamforming technology, or a digital/analog mixed beamforming technology. Different beams may be considered as different resources. In the embodiments of this application, same information or different information may be sent by using different beams. Optionally, in the embodiments of this application, a plurality of beams having a same or similar communication feature may be considered as one beam. One beam may include one or more antenna ports, and is used to transmit a data channel, a control channel, a sounding signal, and the like. For example, a transmit beam may be signal strength distribution formed in different directions in space after a signal is transmitted by an antenna, and a receive beam may be signal strength distribution, in different directions in space, of a radio signal received from an antenna. It may be understood that, one or more antenna ports forming one beam may also be considered as one antenna port set. In the embodiments of this application, the beam may alternatively be embodied in a protocol as a spatial domain filter (spatial filter).

In the embodiments of this application, a bandwidth represents a segment of consecutive frequency domain resources. For example, the bandwidth may be a bandwidth part (BWP), and the BWP may be understood as a segment of consecutive frequency bands. The frequency band includes at least one consecutive sub-band, and each bandwidth part may correspond to one group of system parameters (numerology), including, for example, but not limited to, a subcarrier spacing, a cyclic prefix ("CP" for short) length, a transmission time interval ("TTI" for short), a quantity of symbols (symbol), a resource block ("RB" for short) location, a slot length, and a frame format. In the embodiments of this application, different bandwidth parts may correspond to different system parameters. For a definition of the bandwidth part, refer to the prior art, for example, but not limited to various proposals for NR. As the technology continuously develops, the foregoing definition may also change.

By way of example and not limitation, for ease of description, the following uses an example in which the bandwidth is a BWP for description. However, the embodiments of this application are not limited thereto, and the bandwidth in the embodiments of this application may have another name.

Figure 2:
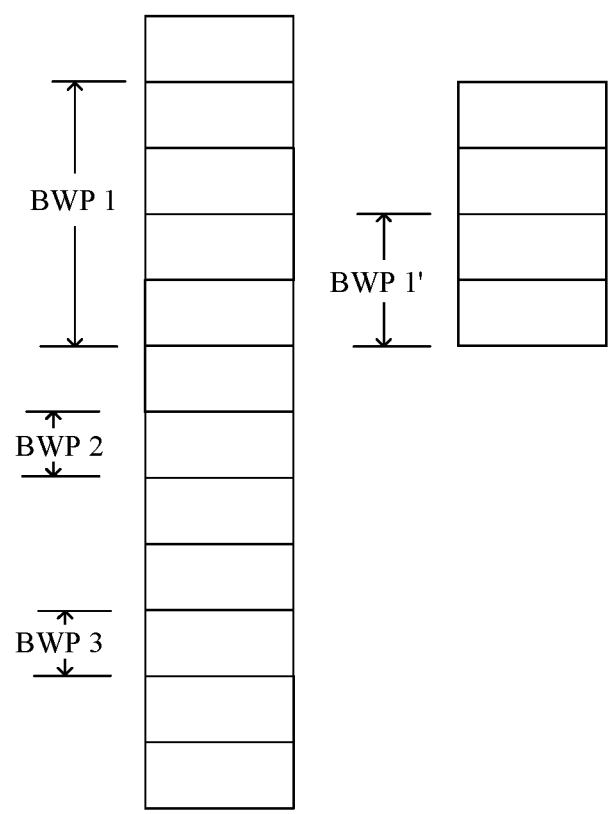
FIG. 2 is a schematic structural diagram of a BWP.

FIG. 2 shows a BWP configuration. In a current standard meeting conclusion, for a terminal device in a connected mode, a two-layer BWP control mechanism is agreed on, that is, a network device (for example, a base station) is allowed to configure a BWP (for example, BWP 1 in FIG. 1) of the terminal device (for example, UE) by using a radio resource control (RRC) message. Then, a media access control control element (MAC CE) or downlink control information (DCI) is used to control the terminal device to activate some frequency resources (for example, BWP 1' in the figure) for communication. For a terminal device in an initial mode (idle), during initial access, the terminal device is in a default BWP (for example, BWP 2 in the figure). In addition, the UE can detect a synchronization signal and a broadcast signal in the BWP. In a wideband cell, in addition to that a BWP used for initial access has a random access resource, it is also agreed in the standard that there is a PRACH (physical random access channel) resource, used for another random access process other than initial access, in another BWP (for example, BWP 3 in the figure).

It should be understood that FIG. 2 shows a BWP configuration according to an embodiment of this application, but this embodiment of this application is not limited thereto. It should be understood that in this embodiment of this application, a first bandwidth and a second bandwidth may be any one of the foregoing BWPs, or a first bandwidth and a second bandwidth may be BWPs in another form. This embodiment of this application is not limited thereto.

It should be understood that, in this embodiment of this application, the network device may send configuration information of a BWP to the terminal device in advance. For example, the configuration information of the BWP may include but is not limited to at least one of the following information: numerology information such as frequency location information of each BWP or a subcarrier spacing of each BWP, an association relationship between uplink and downlink BWPs (for example, a BWP pair in the following), a configuration of a control channel of each BWP, a configuration of a reference signal of each BWP, a configuration of a beam indication of each BWP, and the like.

To make the solutions in the embodiments of this application easier to understand, the following describes a specific process of beam failure recovery.

Figure 3:
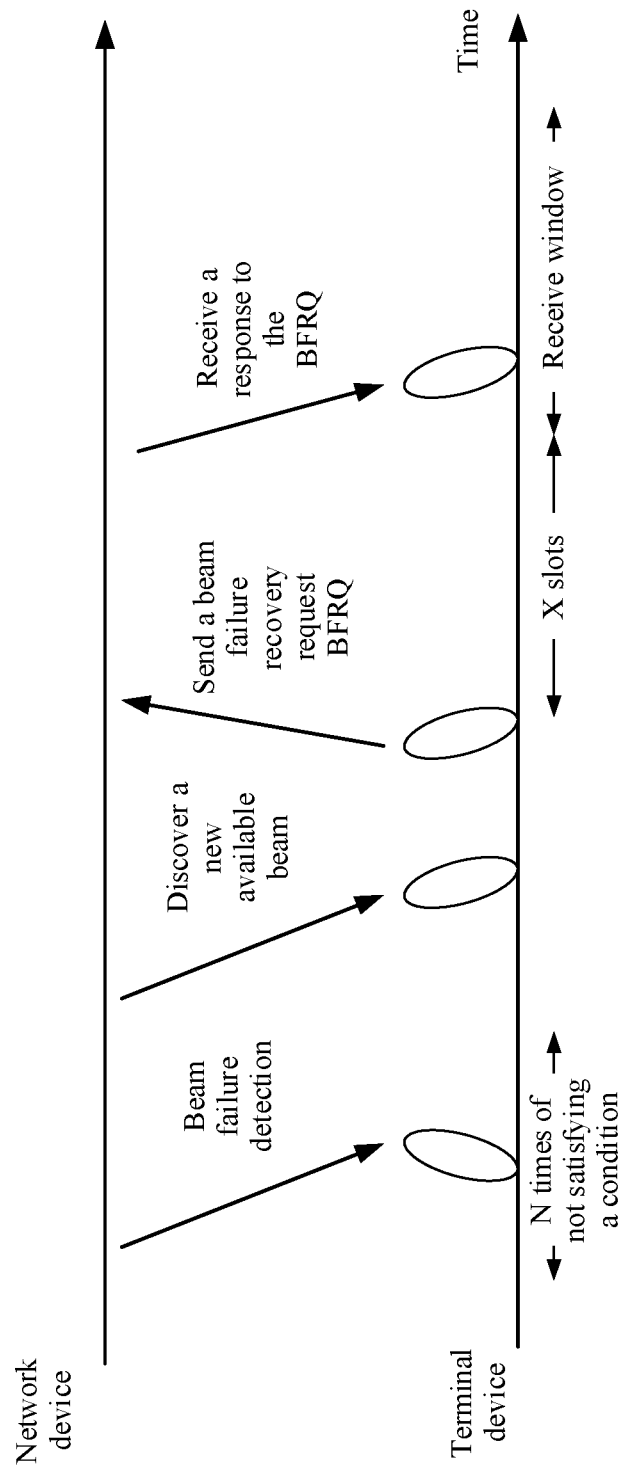
FIG. 3 is a schematic diagram of a beam failure recovery process.

FIG. 3 is a schematic flowchart of beam failure recovery. As shown in FIG. 3, on a terminal device (for example, UE) side, the beam failure recovery procedure mainly includes the following four parts:

1. Beam Failure Detection:

Beam failure detection is based on a beam failure detection reference signal (BFD RS). A terminal device detects the BFD RS at a physical layer periodically. If the BFD RS satisfies a beam failure instance condition (that is, beam quality is lower than a given beam failure threshold), a beam failure instance indication is sent to a higher layer of the terminal device. If there are N consecutive beam failure instances, the higher layer of the terminal device declares a beam failure. It should be understood that, that a beam failure instance is satisfied may mean that quality of all beams in a serving beam set of the terminal device is lower than the beam failure threshold.

Optionally, because an objective of the BFD RS is to estimate beam quality of an assumed control channel, if there is real control channel sending and receiving, a measurement or receiving result of the BFD RS may also be used to determine the beam quality of the control channel. In an implementation, if signal quality of the control channel is higher than a specified threshold, for example, received signal strength/a signal-to-noise ratio/a signal to interference plus noise ratio of reference signal quality of the control channel is higher than a specified threshold, the beam failure instance indication may not be sent, or a BFI counter may be reset. For another example, if the control channel can be correctly received, for example, cyclic redundancy check can succeed when the control channel is decoded, the beam failure instance indication may not be sent, or a BFI counter may be reset.

It should be understood that, in this embodiment of this application, the serving beam set is a reference signal set that is configured by a network device and that is used to monitor radio link quality. A candidate beam set (candidate beam RS) is a reference signal set that is configured by the network device and that is used to discover a new available beam after a beam failure.

2. Discovery of a New Available Beam:

The higher layer of the terminal device requires the physical layer of the terminal device to send a candidate beam (that is, a beam with beam quality higher than a given candidate beam quality threshold) that satisfies a condition to the terminal device. It should be understood that the candidate beam set (candidate beam RS) herein may be preconfigured by the network device for the terminal device.

3. Sending of a Beam Failure Recovery Request (Beam Failure Recovery Request, BFRQ):

The higher layer of the terminal device selects one of candidate beams that satisfy the condition as a new available beam (for example, the new available beam may be marked as q_new), and notifies the physical layer of the terminal device of a random access channel (RACH) resource associated with the new available beam. The physical layer of the terminal device sends the BFRQ to the network device (for example, a base station) on the RACH resource by using q_new.

4. Receiving of a Response of the Base Station to the BFRQ:

For example, starting from an $x^{th}$ (for example, x=4) slot (slot) (that is, an $(n+4)^{th}$ slot) after a slot in which the BFRQ is sent, the terminal device monitors a specific control channel resource set (CORESET) and/or search space (search space) corresponding to the specific control channel resource set by using q_new, to obtain a response that is of the base station to the BFRQ and that is sent by the base station through a downlink control channel PDCCH. Even if a beam indication different from that of q_new is configured or no beam indication is configured for the specific control channel resource set and/or the search space corresponding to the specific control channel resource set, the terminal device receives the specific control channel resource set and/or the search space corresponding to the specific control channel resource set by using a receive beam corresponding to q_new. After obtaining the response, the terminal device may obtain downlink control information DCI for scheduling uplink and downlink data transmission, and then the terminal device communicates with the network device based on the DCI.

It should be understood that, in this embodiment of this application, before beam failure recovery is performed, the network device may send BFR configuration information to the terminal device in advance. For example, the BFR configuration information may include but is not limited to at least one of the following information:

an overall time window for beam failure recovery, a counter for determining a quantity of BFRQ retransmissions, a first counter for determining a beam failure, a first time window for determining a beam failure, a first threshold for determining a BFI, a second counter for determining an available beam, a second time window for determining an available beam, and a second threshold for determining an available beam. Optionally, the configuration information may further include the following configuration information in FIG. 5 to FIG. 8.

Figure 4:
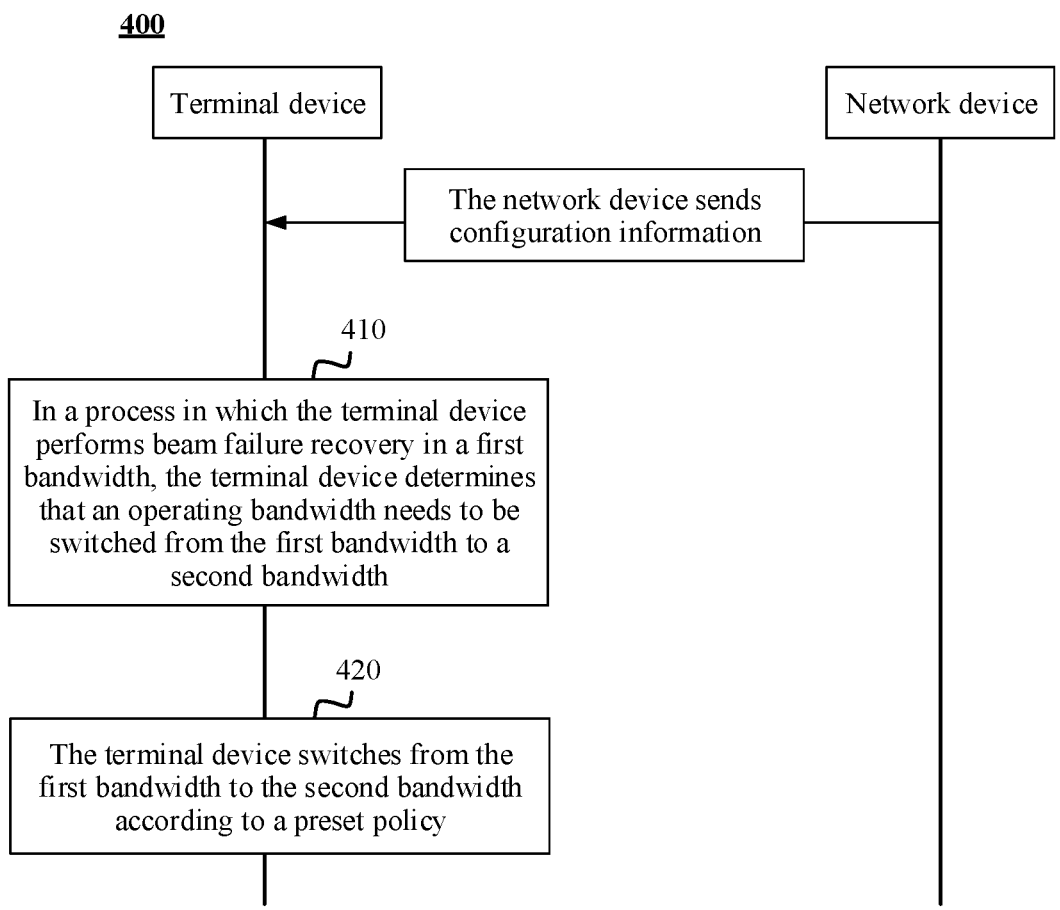
FIG. 4 is a schematic flowchart of a communication method according to this application.

With reference to FIG. 4, the following describes in detail a specific solution in which a terminal device performs corresponding switching processing when the terminal device determines that an operating bandwidth needs to be switched from a first bandwidth to a second bandwidth in a process of beam failure recovery in the first bandwidth according to an embodiment of this application.

FIG. 4 shows a communication method 400 according to an embodiment of this application. The method shown in FIG. 4 is described from a perspective of interaction between a network device and a terminal device. Specifically, in FIG. 4, the network device first sends configuration information to the terminal device. The configuration information may include the foregoing BWP configuration information and the foregoing BFR configuration information. Based on that the configuration information is obtained, the method 400 shown in FIG. 4 includes the following steps.

410: In a process in which the terminal device performs beam failure recovery in a first bandwidth, the terminal device determines that an operating bandwidth needs to be switched from the first bandwidth to a second bandwidth.

It should be understood that the process of beam failure recovery in this embodiment of this application may be any process in FIG. 3. For example, the process of beam failure recovery in this embodiment of this application may be performed, but not limited to:

after the terminal device detects one BFI, after the terminal device detects a beam failure, after the terminal device determines an available beam, after the terminal device sends a beam failure recovery request BFRQ, or after the terminal device starts to detect a response to a BFRQ.

Optionally, in a possible implementation, in step 410, the terminal device determines, based on bandwidth switching indication information received in the process of performing beam failure recovery in the first bandwidth, to switch the operating bandwidth from the first bandwidth to the second bandwidth.

In other words, in the process in which the terminal device performs beam failure recovery, the network device sends the bandwidth switching indication information to the terminal device, where the bandwidth switching indication information is used to indicate that the operating bandwidth of the terminal device needs to be switched from the first bandwidth to the second bandwidth. For example, the network device sends the bandwidth switching indication information based on a scheduling result, for example, when data of the terminal device requires a higher transmission bandwidth. Correspondingly, the terminal device determines, based on the obtained switching indication information, that the operating bandwidth needs to be switched from the first bandwidth to the second bandwidth.

Optionally, in another possible implementation, in step 410, the terminal device determines, based on pre-obtained bandwidth switching indication information, that the operating bandwidth needs to be switched from the first bandwidth to the second bandwidth in the process of beam failure recovery in the first bandwidth.

In other words, the network device sends the bandwidth switching indication information to the terminal device in advance. For example, the network device sends the configuration information based on a scheduling result, for example, when a base station switches an operating bandwidth of the base station at a specific time. The configuration information may indicate that the operating bandwidth of the terminal device is switched from the first bandwidth to the second bandwidth at a moment (for example, an X time after the configuration information is sent, or an X time after the terminal device confirms that the configuration information is correctly received). In addition, at the moment, the terminal device happens to be in the process of beam failure recovery in the first bandwidth.

In this embodiment of this application, the bandwidth switching indication information may be sent by the network device by using RRC signaling, DCI, or a MAC CE. This embodiment of this application is not limited thereto.

420: The terminal device switches from the first bandwidth to the second bandwidth according to a preset policy.

It should be understood that in this embodiment of this application, the preset policy may also be referred to as a preset configuration, a preset rule, a preset solution, a default configuration, or the like. This embodiment of this application is not limited thereto.

Specifically, in this embodiment of this application, there may be a plurality of preset policies. In actual application, the network device and the terminal device may use one of the preset policies to perform corresponding switching behavior. The preset policy used in actual application may be predefined by a protocol, or notified by the base station to the terminal by using signaling, or notified by the terminal to the base station. The terminal may further notify, through capability reporting, the base station of one or more supported policies.

The following describes several optional preset policies in this embodiment of this application in detail with reference to specific examples.

Preset Policy 1:

The terminal device switches from the first bandwidth to the second bandwidth after performing the process of beam failure recovery in the first bandwidth.

In other words, in the preset policy 1, the terminal device first performs the process of beam failure recovery in the first bandwidth, and then switches from the first bandwidth to the second bandwidth after performing beam failure recovery.

Specifically, the terminal device may pause a timer for bandwidth switching.

For a specific process of switching the operating bandwidth from the first bandwidth to the second bandwidth, refer to an existing bandwidth switching process. Details are not described herein.

Therefore, in this embodiment of this application, beam failure recovery is first performed in the first bandwidth, and after the beam failure recovery, normal communication between the terminal device and the network device can be ensured, thereby ensuring service continuity.

Alternatively, in the preset policy 1, the terminal device may keep the operating bandwidth as the first bandwidth after beam failure recovery in the first bandwidth is completed, and skip switching the operating bandwidth.

Because beam failure recovery has been performed in the first bandwidth, the terminal device may perform normal communication with the network device by using the first bandwidth. Therefore, in this embodiment of this application, operating bandwidth switching is avoided after beam failure recovery in the first bandwidth is performed, so that normal running of a service can be ensured, and unnecessary switching actions are avoided.

Preset Policy 2:

The terminal device stops the process of beam failure recovery in the first bandwidth, and switches from the first bandwidth to the second bandwidth.

Specifically, because the operating bandwidth of the terminal device needs to be switched, and the operating bandwidth is no longer the first bandwidth, in this embodiment of this application, when the operating bandwidth needs to be switched from the first bandwidth to the second bandwidth, the process of beam failure recovery in the first bandwidth may be stopped, and the first bandwidth is switched to the second bandwidth. After the operating bandwidth is switched, the terminal device may re-evaluate and re-detect quality of a serving beam in the second bandwidth according to an existing method.

Specifically, the terminal device may stop an overall time window for beam failure recovery in the first bandwidth.

For a specific process of switching the operating bandwidth from the first bandwidth to the second bandwidth, refer to an existing bandwidth switching process. Details are not described herein.

It should be understood that, in this embodiment of this application, the stopping, by the terminal device, the process of beam failure recovery in the first bandwidth includes:

resetting, by the terminal device, all time windows and counters in beam failure recovery.

Preset Policy 3:

The terminal device switches from the first bandwidth to the second bandwidth based on configurations of control channels of the first bandwidth and the second bandwidth.

It should be understood that, based on the foregoing descriptions, in the preset policy 1 and the preset policy 2, regardless of a performed process of beam failure recovery, the terminal device directly performs corresponding processing based on the solution determined in the preset policy 1 or the preset policy 2, and does not need to consider a specific process of beam failure recovery.

The preset policy 3 is different from the foregoing two preset policies. In the preset policy 3, the terminal device performs corresponding switching processing based on the configurations of the control channels of the first bandwidth and the second bandwidth, and specific switching processing may be different for different processes of beam failure recovery.

Optionally, in an embodiment, in this embodiment of this application, that the configurations of the control channels of the first bandwidth and the second bandwidth are the same means that beams of the control channels of the first bandwidth and the second bandwidth are the same.

For example, in this embodiment of this application, that the beams of the control channels of the first bandwidth, for example, BWP #x and the second bandwidth, for example, BWP #y, are the same refers to any one of the following cases:

Case 1:

One or more CORESETs of BWP #x are in a one-to-one correspondence with one or more CORESETs of BWP #y, and TCI values of BWP #x and BWP #y are the same.

In this embodiment of this application, a transmission configuration index (Transmission Configuration Index, TCI) is a beam indication method. For example, a structure of the TCI is as follows:

```
TCI-State ::=           SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServCellIndex
    bwp-Id                  BWP-Id
    referenceSignal         CHOICE {
        csi-rs                  NZP-CSI-RS-ResourceId,
        ssb                     SSB-Index,
        csi-RS-for-tracking     NZP-CSI-RS-ResourceSetId
    },
    qcl-Type                ENUMERATED {typeA, typeB, typeC,
typeD},
    ...
}
```

The TCI may include a plurality of parameters, for example, a cell ID, a BWP ID, a reference signal ID, a synchronization signal block ID, and a QCL type. The terminal may determine a receiving method according to an indication of the TCI.

For example, a beam indication of a control channel is a TCI state. The terminal may receive the control channel by using a QCL hypothesis that corresponds to a QCL type in the TCI state and that is used when the terminal receives a reference signal that corresponds to a reference signal ID or a synchronization signal block that corresponds to a synchronization signal block ID in the TCI state.

Case 2:

One or more CORESETs of BWP #x are in a one-to-one correspondence with one or more CORESETs of BWP #y, and RS IDs and QCL types in TCIs of BWP #x and BWP #y are the same.

Case 3:

One or more CORESETs of BWP #x are in a one-to-one correspondence with one or more CORESETs of BWP #y, and RSs represented by RS IDs in TCIs in BWP #x and BWP #y have a QCL relationship.

Case 4:

BFD RS sets configured for BWP #x and BWP #y are the same.

Case 5:

TCI sets of one or more CORESETs of BWP #x and TCI sets of one or more CORESETs of BWP #y have a same element.

The following describes the solution of the preset policy 3 in detail by using an example in which the first bandwidth is BWP #x, and the second bandwidth is BWP #y.

Specifically, in the preset policy 3, the switching, by the terminal device, from the first bandwidth to the second bandwidth based on configurations of control channels of the first bandwidth and the second bandwidth includes:

when the configurations of the control channels of the first bandwidth and the second bandwidth are different, stopping, by the terminal device, the process of beam failure recovery in the first bandwidth, and switching from the first bandwidth to the second bandwidth. This processing manner is similar to that in the foregoing policy 2, and details are not described herein again.

Specifically, although beam failure recovery needs to be performed in the first bandwidth, that is, beam quality in the first bandwidth is relatively poor, because the configurations of the control channels of the first bandwidth and the second bandwidth are different, and beam quality in the second bandwidth has no association relationship with the first bandwidth, the beam quality in the second bandwidth may be relatively good. In other words, that a beam in BWP #x cannot be used does not mean that a beam in BWP #y cannot be used. Therefore, after switching to BWP #y, UE may re-evaluate the quality of the serving beam. Therefore, when the operating bandwidth needs to be switched from the first bandwidth to the second bandwidth, in this embodiment of this application, the process of beam failure recovery in the first bandwidth may not be considered. The process of beam failure recovery in the first bandwidth is directly stopped, and the operating bandwidth is switched from the first bandwidth to the second bandwidth.

Alternatively, in the preset policy 3, the switching, by the terminal device, from the first bandwidth to the second bandwidth based on configurations of control channels of the first bandwidth and the second bandwidth includes:

when the configurations of the control channels of the first bandwidth and the second bandwidth are the same, switching, by the terminal device, from the first bandwidth to the second bandwidth; and continuing, by the terminal device, to perform, in the second bandwidth, the process of beam failure recovery in the first bandwidth.

Specifically, beam failure recovery needs to be performed in the first bandwidth, that is, beam quality in the first bandwidth is relatively poor. Because the configurations of the control channels of the first bandwidth and the second bandwidth are the same, beam quality in the second bandwidth is similar to the beam quality in the first bandwidth. Therefore, after the operating bandwidth is switched to the second bandwidth, beam failure recovery also needs to be performed. Therefore, in this embodiment of this application, after switching from the first bandwidth to the second bandwidth, the terminal device directly continues to perform, in the second bandwidth, the process of beam failure recovery in the first bandwidth, so that a part of the process of beam failure recovery that has been completed in the first bandwidth can be avoided from being performed again in the second bandwidth, and a beam failure recovery time in the second bandwidth is reduced.

In other words, if beams of control channels of different BWPs are the same, the serving beam does not change after BWP #y is switched to, and only a frequency changes. In this case, it is most likely that a beam state in BWP #x is also reflected in BWP #y, and a beam failure recovery procedure that has been started in BWP #x should be continued.

It should be understood that, in this embodiment of this application, the continuing, by the terminal device, to perform, in the second bandwidth, the process of beam failure recovery in the first bandwidth may include: maintaining, by the terminal device, all time windows and counters in beam failure recovery in the first bandwidth, and continuing to perform the process of beam failure recovery in the second bandwidth.

In different processes of beam failure recovery, actions of the continuing, by the terminal device, to perform, in the second bandwidth, the process of beam failure recovery in the first bandwidth are not totally the same. With reference to each process of beam failure recovery, the following describes how the terminal device continues to perform, in the second bandwidth, the process of beam failure recovery in the first bandwidth after switching from the first bandwidth to the second bandwidth when the configurations of the control channels of the first bandwidth and the second bandwidth are the same.

In an implementation, after detecting one BFI in the first bandwidth, the terminal device determines that the operating bandwidth needs to be switched from the first bandwidth to the second bandwidth.

The continuing, by the terminal device, to perform, in the second bandwidth, the process of beam failure recovery in the first bandwidth includes:

maintaining, by the terminal device, an overall time window for beam failure recovery in the first bandwidth, and a first counter and/or a first time window for determining a beam failure, and continuing to perform a process of beam failure detection in the second bandwidth.

After switching to BWP #y, the terminal device may continue to maintain a time window and a counter in BWP #x, and perform serving beam monitoring and a corresponding beam failure recovery procedure in BWP #y according to the prior art.

In another implementation, after detecting a beam failure in the first bandwidth, the terminal device determines that the operating bandwidth needs to be switched from the first bandwidth to the second bandwidth.

The continuing, by the terminal device, to perform, in the second bandwidth, the process of beam failure recovery in the first bandwidth includes:

maintaining, by the terminal device, an overall time window for beam failure recovery in the first bandwidth, and performing at least one of the following actions:

starting to perform a process of discovering an available candidate beam in the second bandwidth;

sending a beam failure recovery request; and monitoring a process in which the network device responds to the beam failure recovery request.

Specifically, the terminal device has detected n (for example, n is a beam failure threshold) consecutive BFIs. In other words, when a failure has been declared, if configurations of control channels in different BWPs are the same, the terminal device switches the BWP, but maintains all counters/time windows. After switching to BWP #y, the terminal device may perform, according to the prior art, a beam failure recovery procedure such as discovery of a new available beam.

Optionally, in another embodiment, a failed beam in the first bandwidth is an available beam in the second bandwidth, and the starting to perform a process of discovering an available candidate beam in the second bandwidth includes: performing, by the terminal device, the process of discovering an available candidate beam in a first subset of a candidate beam set in the second bandwidth, where the first subset includes a beam other than the failed beam in the candidate beam set in the second bandwidth.

In other words, if a failed beam in BWP #x is configured as a candidate beam in BWP #y, when determining an available beam, the terminal device may not measure the failed beam in BWP #x.

Therefore, in this embodiment of this application, when an available beam is searched for in the second bandwidth, measurement of the failed beam in the first bandwidth is avoided, so that unnecessary repeated measurement work can be avoided, and efficiency of determining the available beam can be improved.

In another implementation, after determining an available beam in the first bandwidth, the terminal device determines that the operating bandwidth needs to be switched from the first bandwidth to the second bandwidth.

The continuing, by the terminal device, to perform, in the second bandwidth, the process of beam failure recovery in the first bandwidth includes:

maintaining, by the terminal device, an overall time window for beam failure recovery in the first bandwidth, and performing at least one of the following actions:

sending, by the terminal device based on the available beam in the first bandwidth, a beam recovery request, and monitoring a response of the network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

Optionally, the available beam in the second bandwidth is the same as the available beam in the first bandwidth. For ease of description, in this specification, an available beam discovered in BWP #x may be marked as {BWP #x, q_new_x}. If reference signals with same q_new_x are configured in BWP #y, q_new_x may be directly a reference signal in BWP #y. In other words, the available beam in the second bandwidth is the same as the available beam in the first bandwidth.

Alternatively, the available beam in the second bandwidth and the available beam in the first bandwidth satisfy a QCL relationship. Specifically, if there is a QCL relationship between RSs in different BWPs, {BWP #x, q_new_x} and {BWP #y, q_new_x'} that have a QCL relationship may be found, and {BWP #y, q_new_x'} is used as an available beam in BWP #y. Therefore, in this embodiment of this application, after the available beam in the first bandwidth is determined based on a QCL relationship between beams, the available beam in the second bandwidth may be directly determined based on the QCL relationship, and the available beam in the second bandwidth does not need to be reselected.

Alternatively, the available beam in the second bandwidth is obtained by the terminal device through measurement in the second bandwidth. Specifically, after switching to BWP #y, the terminal device needs to measure a reference signal of a candidate beam in BWP #y in an existing manner, to find a new available beam {BWP #y, q_new_y}.

Specifically, before determining {BWP #y, q_new_y}, the terminal device sends the BFRQ based on {BWP #x, q_new_x}. After determining {BWP #y, q_new_y}, the terminal device sends the BFRQ based on {BWP #y, q_new_y}. In other words, before determining the available beam in the second bandwidth, the terminal device transmits the BFRQ in the second bandwidth by using the available beam found in the first bandwidth, and after determining the available beam in the second bandwidth, the terminal device transmits the BFRQ by using the found available beam.

In another implementation, after sending a beam failure recovery request BFRQ in the first bandwidth, the terminal device determines that the operating bandwidth needs to be switched from the first bandwidth to the second bandwidth.

The continuing, by the terminal device, to perform, in the second bandwidth, the process of beam failure recovery in the first bandwidth includes:

maintaining, by the terminal device, an overall time window for beam failure recovery in the first bandwidth and a counter for determining a quantity of BFRQ retransmissions, and performing at least one of the following actions:

sending, by the terminal device based on an available beam in the first bandwidth, the beam recovery request, and monitoring a response of the network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

Optionally, the available beam in the second bandwidth is the same as the available beam in the first bandwidth. For ease of description, an available beam discovered in BWP #x may be marked as {BWP #x, q_new_x}. If reference signals with same q_new_x are configured in BWP #y, q_new_x may be directly a reference signal in BWP #y. In other words, the available beam in the second bandwidth is the same as the available beam in the first bandwidth.

Alternatively, the available beam in the second bandwidth and the available beam in the first bandwidth satisfy a QCL relationship. Specifically, if there is a QCL relationship between RSs in different BWPs, {BWP #x, q_new_x} and {BWP #y, q_new_x'} that have a QCL relationship may be found, and {BWP #y, q_new_x'} is used as an available beam in BWP #y. Therefore, in this embodiment of this application, after the available beam in the first bandwidth is determined based on a QCL relationship between beams, the available beam in the second bandwidth may be directly determined based on the QCL relationship, and the available beam in the second bandwidth does not need to be reselected.

Alternatively, the available beam in the second bandwidth is obtained by the terminal device through measurement in the second bandwidth. Specifically, after switching to BWP #y, the terminal device needs to measure a reference signal of a candidate beam in BWP #y in an existing manner, to find anew available beam {BWP #y, q_new_y}.

Specifically, before determining {BWP #y, q_new_y}, the terminal device sends the BFRQ based on {BWP #x, q_new_x}. After determining {BWP #y, q_new_y}, the terminal device sends the BFRQ based on {BWP #y, q_new_y}. In other words, before determining the available beam in the second bandwidth, the terminal device transmits the BFRQ in the second bandwidth by using the available beam found in the first bandwidth, and after determining the available beam in the second bandwidth, the terminal device transmits the BFRQ by using the found available beam.

It should be noted that, in this embodiment of this application, if there is no QCL relationship between {BWP #y, q_new_y} and {BWP #x, q_new_x}, after the terminal device switches the operating bandwidth to the second bandwidth, the BFRQ retransmission counter can be reset.

If the terminal sends the BFRQ in the first bandwidth, and the terminal switches from the first bandwidth to the second bandwidth, the terminal may temporarily switch back to the first bandwidth, and monitor a response of the base station to the BFRQ in a specific CORESET and/or specific search space of the first bandwidth. The terminal should monitor the response by using {BWP #x, q_new_x}. After sending the BFRQ in the second bandwidth, the terminal may terminate the behavior of switching back to the first bandwidth.

In another manner, if the terminal sends the BFRQ in the first bandwidth, and the terminal switches from the first bandwidth to the second bandwidth, the terminal may monitor a response of the base station to the BFRQ in a specific CORESET and/or specific search space of the second bandwidth. The terminal should monitor the response by using {BWP #x, q_new_x} or {BWP #y, q_new_x'}.

In another implementation, after starting to detect a response to a BFRQ, the terminal device determines that the operating bandwidth needs to be switched from the first bandwidth to the second bandwidth.

The continuing, by the terminal device, to perform, in the second bandwidth, the process of beam failure recovery in the first bandwidth includes:

maintaining, by the terminal device, an overall time window for beam failure recovery in the first bandwidth and a counter for determining a quantity of BFRQ retransmissions, and performing at least one of the following actions:

monitoring, by the terminal device based on an available beam in the first bandwidth, a response of the network device to the beam failure recovery request;

sending, by the terminal device based on the available beam in the first bandwidth, the beam recovery request, and monitoring the response of the network device to the beam failure recovery request; and determining, by the terminal device, an available beam in the second bandwidth, and sending, by the terminal device based on the available beam in the second bandwidth, the beam recovery request, and monitoring the response of the network device to the beam failure recovery request.

Optionally, the available beam in the second bandwidth is the same as the available beam in the first bandwidth. For ease of description, an available beam discovered in BWP #x may be marked as {BWP #x, q_new_x}. If reference signals with same q_new_x are configured in BWP #y, q_new_x may be directly a reference signal in BWP #y. In other words, the available beam in the second bandwidth is the same as the available beam in the first bandwidth.

Alternatively, the available beam in the second bandwidth and the available beam in the first bandwidth satisfy a QCL relationship. Specifically, if there is a QCL relationship between RSs in different BWPs, {BWP #x, q_new_x} and {BWP #y, q_new_x'} that have the QCL relationship may be found, and {BWP #y, q_new_x'} is used as an available beam in BWP #y. Therefore, in this embodiment of this application, after the available beam in the first bandwidth is determined based on a QCL relationship between beams, the available beam in the second bandwidth may be directly determined based on the QCL relationship, and the available beam in the second bandwidth does not need to be reselected.

Alternatively, the available beam in the second bandwidth is obtained by the terminal device through measurement in the second bandwidth. Specifically, after switching to BWP #y, the terminal device needs to measure a reference signal of a candidate beam in BWP #y in an existing manner, to find anew available beam {BWP #y, q_new_y}.

It should be understood that, because BWP switching is controlled by the network device, if BWP switching occurs after a BFRQ of the terminal device in BWP #x is received, the network device sends a response to the terminal device in BWP #y.

Specifically, after switching to the second operating bandwidth, before sending a BFRQ in BWP #y, the terminal device needs to monitor, based on q_new_x, the response sent by the network device. If the terminal device does not receive the response, the terminal device sends the BFRQ in BWP #y, and monitors, based on q_new_y, the response sent by the network device.

Because the configurations of the control channels of the first bandwidth and the second bandwidth are the same, the beam quality in the second bandwidth is similar to the beam quality in the first bandwidth. Therefore, after the operating bandwidth is switched to the second bandwidth, beam failure recovery also needs to be performed.

Therefore, in this embodiment of this application, after switching from the first bandwidth to the second bandwidth, the terminal device directly continues to perform, in the second bandwidth, the process of beam failure recovery in the first bandwidth, so that a process of beam failure recovery that has been completed in the first bandwidth can be avoided from being performed again in the second bandwidth, and a beam failure recovery time in the second bandwidth is reduced.

Figure 5:
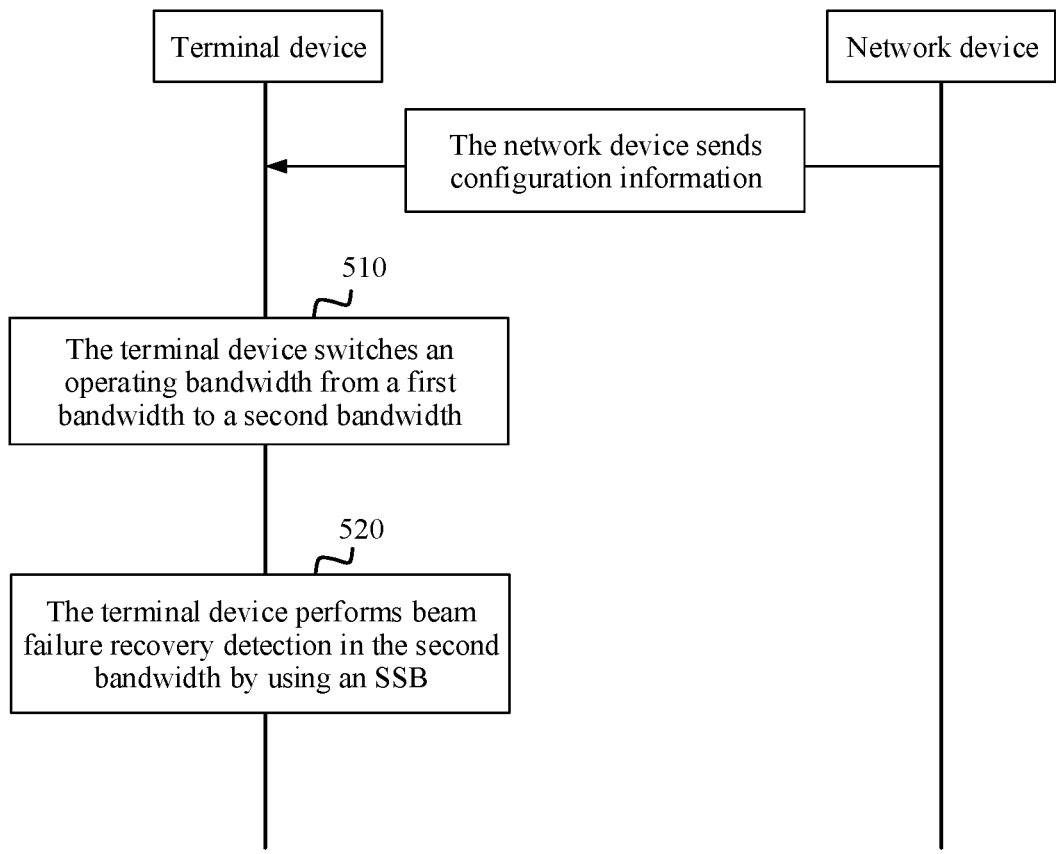
FIG. 5 is a schematic flowchart of another communication method according to this application.

FIG. 5 shows a communication method according to an embodiment of this application. The method shown in FIG. 5 is described from a perspective of interaction between a network device and a terminal device. Specifically, the method shown in FIG. 5 may be applied to a scenario in which after a first bandwidth is switched to a second bandwidth, there is no reference signal used for beam detection in the second bandwidth, for example, a scenario in which the terminal device is switched from a DL BWP #x to a DL BWP #y, and no reference signal used for beam detection is configured in the DL BWP #y. Specifically, a method 500 shown in FIG. 5 includes the following steps.

510: A terminal device switches an operating bandwidth from a first bandwidth to a second bandwidth.

520: The terminal device performs beam failure recovery detection in the second bandwidth by using a synchronization signal/broadcast channel block (SSB).

It should be understood that, in this embodiment of this application, the SSB and a DLRS in the second bandwidth may satisfy a QCL relationship.

Therefore, in this embodiment of this application, the second bandwidth is measured by using the SSB, thereby resolving a problem that there is no reference signal used for beam detection in the second bandwidth.

Optionally, in an embodiment, the SSB is carried in the second bandwidth, and the SSB and the DLRS in the second bandwidth satisfy the QCL relationship.

Specifically, if an SSB is configured in a DL BWP #y, and the SSB and the DLRS in the second bandwidth satisfy the QCL relationship, the terminal device may perform beam failure recovery detection by using the SSB in the QCL relationship.

Optionally, in an embodiment, the SSB is carried in a third bandwidth, and the SSB and the DLRS in the second bandwidth satisfy the QCL relationship.

Optionally, the third bandwidth is a predefined bandwidth, a bandwidth with a preset label, or a bandwidth with a preset ID.

For example, the third bandwidth is a predefined BWP configured by a protocol or a network device, or a BWP with a preset label, for example, BWP #0, or a BWP with a preset ID, for example, a BWP with a smallest or largest ID in all BWPs.

Specifically, if no SSB is configured for the DL BWP #y, the terminal device may periodically switch back to a default DL BWP, that is, the third bandwidth, and perform beam failure recovery detection depending on the SSB of the third bandwidth.

It should be understood that the third bandwidth and the first bandwidth may be a same bandwidth, or may be different bandwidths. This is not limited in this embodiment of this application.

Optionally, in another embodiment, the method further includes:

obtaining, by the terminal device, configuration information, where the configuration information is used to configure the SSB and the DLRS in the second bandwidth to satisfy the QCL relationship.

Optionally, in another embodiment, the method further includes:

If a reference signal for beam detection in the second bandwidth is configured as a reference signal in another bandwidth, the terminal device may determine, by measuring the reference signal in the another bandwidth, whether a beam in the second bandwidth fails.

Optionally, if another reference signal that has a QCL relationship with a reference signal for beam detection in the second bandwidth is configured in another available bandwidth, the terminal device may determine, by measuring the another reference signal of QCL of the reference signal for beam detection in the second bandwidth in the another available bandwidth, whether a beam in the second bandwidth fails. Further, optionally, if a reference signal for beam detection in the second bandwidth is configured as a reference signal in another bandwidth, but the another bandwidth is not activated, the terminal device may ignore the reference signal in the bandwidth that is not activated.

Figure 6:
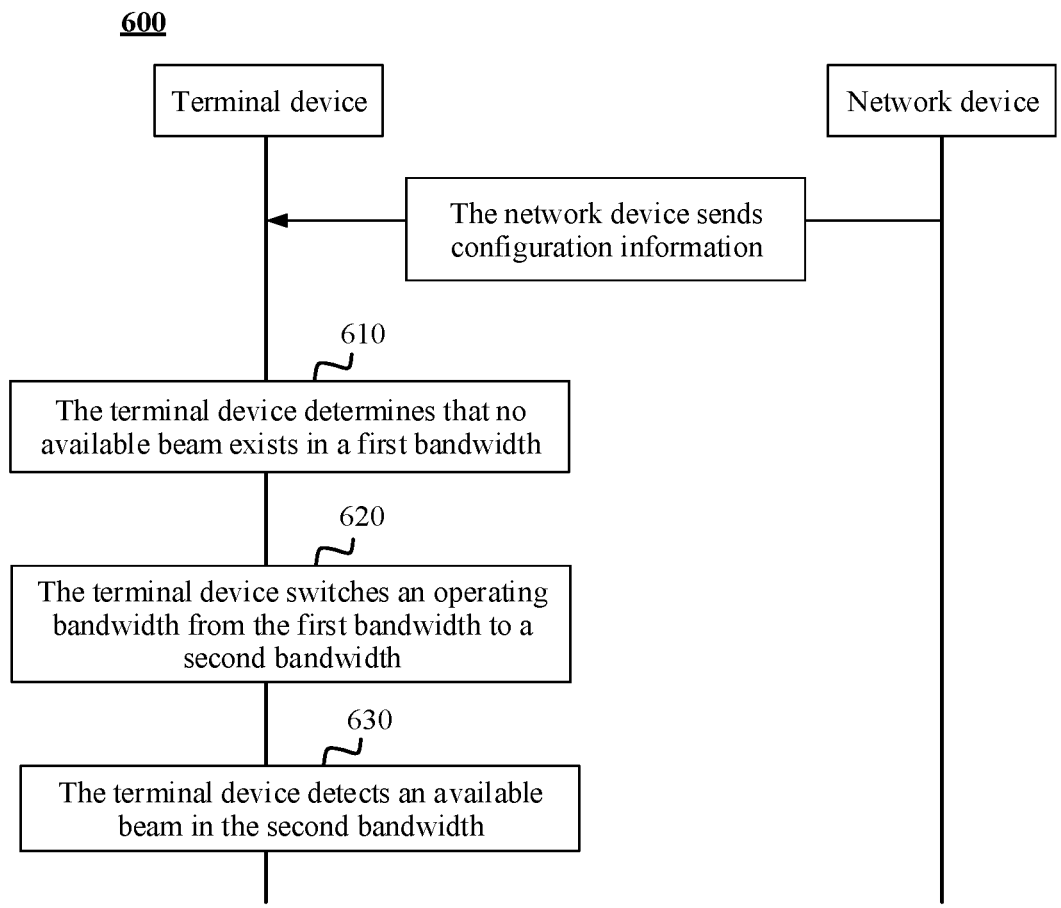
FIG. 6 is a schematic flowchart of another communication method according to this application.

FIG. 6 shows a communication method according to an embodiment of this application. The method shown in FIG. 6 is described from a perspective of interaction between a network device and a terminal device. Specifically, the method shown in FIG. 6 may be applied to a scenario in which no available beam is found in a first bandwidth. For example, in the method shown in FIG. 6, when there is no available beam in BWP #x, the terminal device detects an available beam in BWP #y. Specifically, a method 600 shown in FIG. 6 includes the following steps.

610: A terminal device determines that no available beam exists in a first bandwidth.

620: The terminal device switches an operating bandwidth from the first bandwidth to a second bandwidth.

630: The terminal device detects an available beam in the second bandwidth.

Optionally, in another embodiment, the method further includes: obtaining, by the terminal device, configuration information, where the configuration information is used to configure that candidate beams of the first bandwidth include a beam of the first bandwidth and a beam of the second bandwidth.

For example, a candidate beam set in BWP #x may include an RS in BWP #x and an RS in BWP #y. After a beam failure occurs, the terminal device may preferentially detect an available beam in a current BWP, and when the terminal device determines that no available beam exists in the current BWP, the terminal device switches to BWP #y to detect an available beam.

It should be understood that when a candidate beam set in the first bandwidth includes beams in a plurality of bandwidths, priorities of the beams in the plurality of bandwidths may be configured by a network device or predefined. For example, the priorities of the beams in the plurality of bandwidths may be sorted in descending order of IDs of the bandwidths.

Therefore, in this embodiment of this application, an available beam is discovered by checking beams of a plurality of bandwidths, so that a probability of discovering the available beam can be increased.

Figure 7:
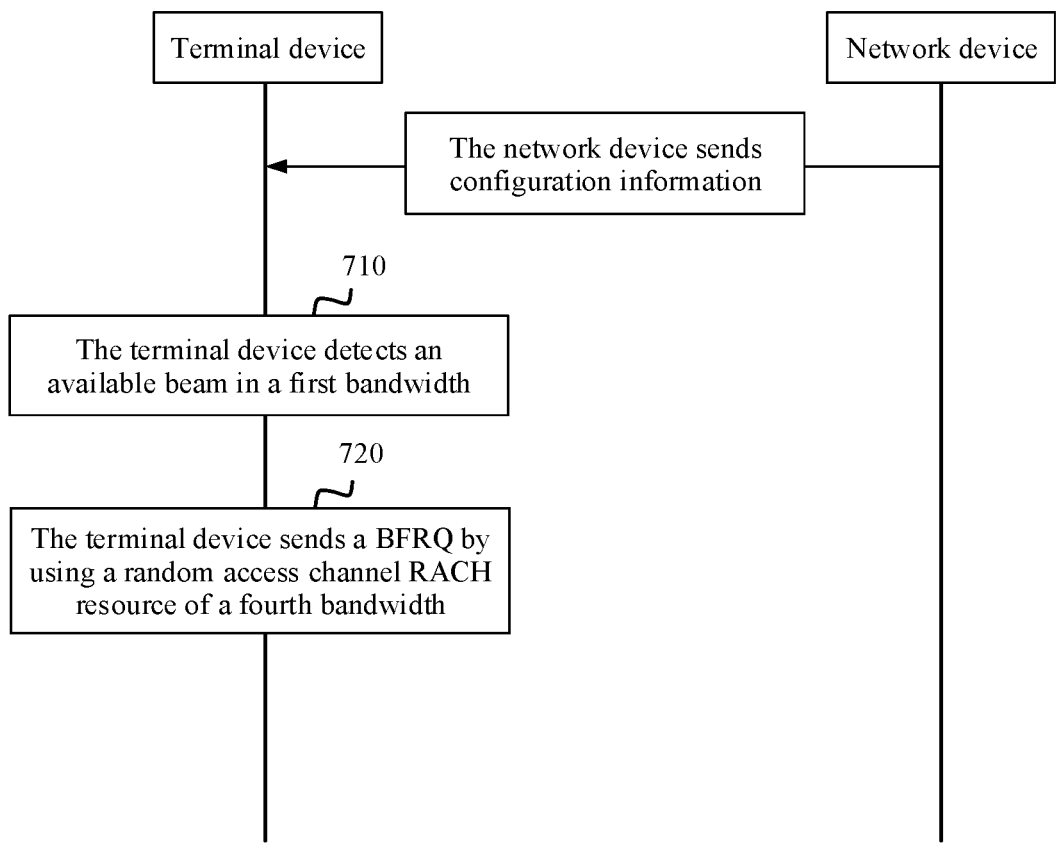
FIG. 7 is a schematic flowchart of another communication method according to this application.

FIG. 7 shows a communication method according to an embodiment of this application. The method shown in FIG. 7 is described from a perspective of interaction between a network device and a terminal device. Specifically, the method shown in FIG. 7 may be applied to a scenario in which no RACH resource is configured in a first bandwidth. For example, in the method shown in FIG. 7, when an available beam is detected in BWP #x, the terminal device sends a BFRQ by using an RACH resource of another bandwidth such as BWP #z. Specifically, a method 700 shown in FIG. 7 includes the following steps.

710: A terminal device detects an available beam (a downlink beam) in a first bandwidth.

720: The terminal device sends a BFRQ by using a random access channel RACH resource of a fourth bandwidth.

Optionally, the fourth bandwidth is a predefined bandwidth, a bandwidth with a preset label, or a bandwidth with a preset ID.

For example, the fourth bandwidth is a predefined BWP configured by a protocol or a network device, or a BWP with a preset label, for example, BWP #0, or a BWP with a preset ID, for example, a BWP with a smallest or largest ID in all BWPs.

Optionally, in an embodiment, the method further includes:

obtaining, by the terminal device, configuration information, where the configuration information is used to configure an association relationship between a reference signal RS of the first bandwidth and the RACH resource.

It should be understood that the association relationship may also be referred to as a binding relationship, a correspondence, or the like. This embodiment of this application is not limited thereto.

For example, the configuration information is used to configure an association relationship or a binding relationship between {UL BWP #z, RACH} and {DL BWP #x, q_new_x}.

Based on the association relationship, after finding an available beam q_new_x, the terminal device may send the BFRQ by using the UL BWP #z RACH resource.

Optionally, the configuration information is further used to configure a QCL relationship between the RS in the first bandwidth and an RS in the fourth bandwidth.

For example, the configuration information is used to configure a QCL relationship between {DL BWP #z, q_new_x'} and {DL BWP #x, q_new_x}.

Optionally, the available beam in the first bandwidth is a downlink beam, and the configuration information is further used to configure an association relationship between the downlink beam of the first bandwidth and an uplink beam of the fourth bandwidth.

For example, the configuration information is used to configure an association relationship or a binding relationship between {DL BWP #x, q_new_x} and {UL BWP #z, Tx}.

Optionally, in another embodiment, the configuration information is used to configure an association relationship between the available beam of the first bandwidth and an available beam (downlink beam) of the fourth bandwidth. For example, the configuration information configures an association relationship or a binding relationship between {DL BWP #z, q_new_x'} and {DL BWP #x, q_new_x}. In this case, the terminal device may receive a response to the BFRQ based on the association relationship by using the available beam of the fourth bandwidth. Correspondingly, the method further includes:

receiving, by the terminal device by using a downlink beam of the fourth bandwidth, a response to a BFRQ transmitted by using a downlink control channel PDCCH resource.

Optionally, in another embodiment, the network device may further transmit, to UE by using another cell or carrier component, a response to a BFRQ of a first bandwidth and/or a new beam indication configuration used for a current cell or carrier component. For example, the network device may send signaling, including RRC signaling, MAC-CE signaling, DCI signaling, and the like, to the UE in the another cell or on the another carrier component, so as to transmit, to the UE, the response to the beam failure recovery request sent by the UE in the first bandwidth of the current cell or carrier component and beam configuration information used for the first bandwidth of the current cell or carrier component, where the beam configuration information includes an identifier of a cell or carrier component, an identifier of a bandwidth, a beam of a control channel, and the like. Because the another cell or carrier component may have a more stable communication link, this manner may improve a success rate of receiving a response by UE.

Therefore, in this embodiment of this application, a problem that a beam failure recovery request cannot be sent because there is no uplink resource in a current bandwidth can be avoided by sending the BFRQ in another bandwidth.

Figure 8:
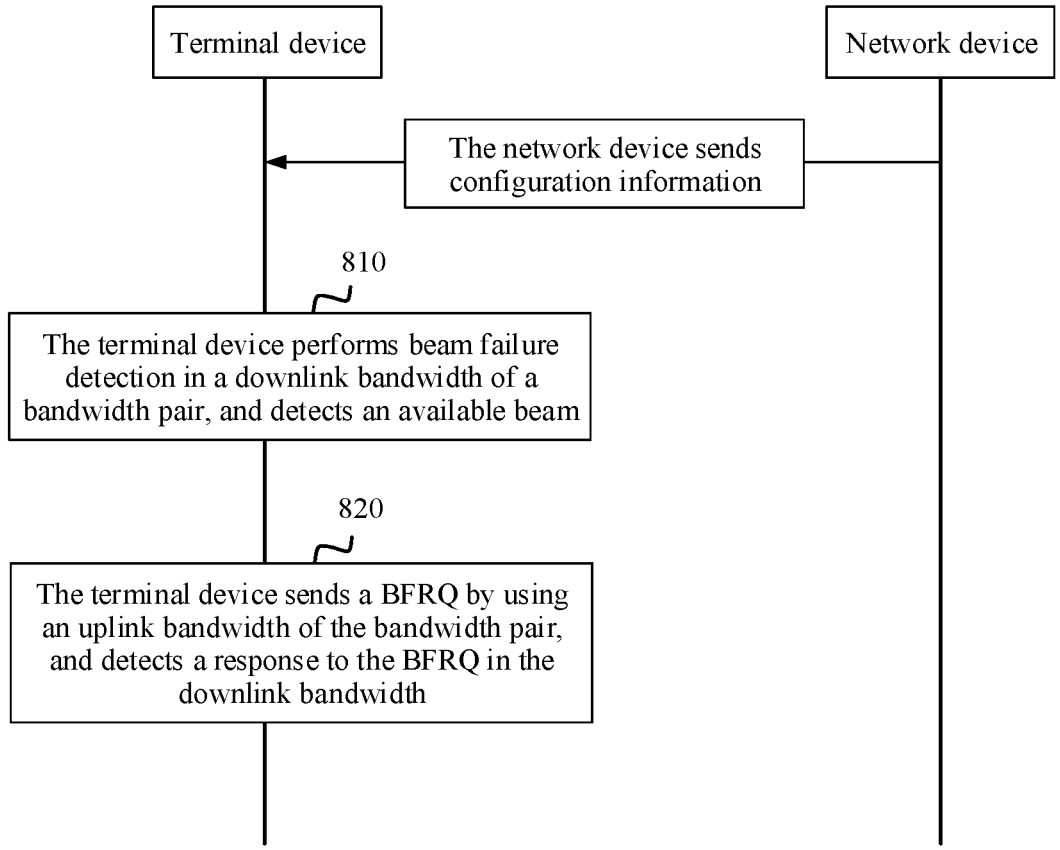
FIG. 8 is a schematic flowchart of another communication method according to this application.

FIG. 8 shows a communication method according to an embodiment of this application. The method shown in FIG. 8 is described from a perspective of interaction between a network device and a terminal device. Specifically, the method shown in FIG. 8 may be used in a scenario in which uplink BWPs and downlink BWPs do not match. For example, a scenario in which a quantity of uplink BWPs is greater than or less than a quantity of downlink BWPs. Specifically, a method 800 shown in FIG. 8 includes the following steps.

810: A terminal device performs beam failure detection in a downlink bandwidth of a bandwidth pair, and detects an available beam.

820: The terminal device sends a BFRQ by using an uplink bandwidth of the bandwidth pair, and detects a response to the BFRQ in the downlink bandwidth, where each bandwidth pair includes the uplink bandwidth and the downlink bandwidth.

Optionally, the method further includes: obtaining, by the terminal device, configuration information, where the configuration information is used to configure the bandwidth pair.

Specifically, in this embodiment of this application, a BWP pair is configured by a network device or predefined by a protocol, and each BWP pair includes a corresponding uplink BWP and a corresponding downlink BWP. Specifically, in a process of beam failure recovery, a BFD RS, a candidate beam RS, and a response of a base station to the BFRQ are detected by using the downlink BWP in the BWP pair, and the BFRQ is sent by using the uplink BWP. In this manner, a problem of mismatch between the uplink BWP and the downlink BWP can be resolved.

It should be noted that the foregoing describes the communication method in the embodiments of this application with reference to FIG. 4 to FIG. 8. FIG. 4 describes a bandwidth switching solution in a process of beam failure recovery, and FIG. 5 to FIG. 8 describe beam failure detection solutions in several scenarios. It should be understood that the foregoing embodiments are not independent of each other. In actual application, the methods in FIG. 5 to FIG. 8 may be combined with the method in FIG. 4, to perform beam failure recovery according to the methods in FIG. 5 to FIG. 8 after switching to the second bandwidth in FIG. 4.

In actual application, the solutions in FIG. 5 to FIG. 8 are applied to the method embodiment in FIG. 4, and the network device or the protocol may further pre-configure the configuration information in the embodiments in FIG. 5 to FIG. 8 for the terminal device.

For example, before performing the methods in FIG. 4 to FIG. 8 and the methods in which the embodiments in FIG. 4 to FIG. 8 are combined, the network device needs to send some or all of the following configuration information to the terminal device:

a QCL relationship between a downlink signal and a synchronization signal/broadcast channel block SSB that are cross-bandwidth, where for example, in FIG. 5, the SSB and the DLRS in the second bandwidth satisfy the QCL relationship;

a configuration in which candidate beams in one bandwidth include beams in a plurality of bandwidths, for example, in FIG. 6, the configuration in which the candidate beams of the first bandwidth include a beam of the first bandwidth and a beam of the second bandwidth;

an association relationship between cross-bandwidth reference signals, where for example, as shown in FIG. 7, there is a QCL relationship between the RS in the first bandwidth and the RS in the fourth bandwidth;

an association relationship between an uplink resource and a reference signal of a candidate beam that are cross-bandwidth, for example, as shown in FIG. 7, the association relationship between the reference signal of the first bandwidth and the RACH resource of the fourth bandwidth;

an association relationship between cross-bandwidth uplink and downlink beams, for example, in FIG. 7, the association relationship between the downlink beam of the first bandwidth and the uplink beam of the fourth bandwidth; and an association relationship between uplink and downlink bandwidths, for example, the bandwidth pair in FIG. 8.

It should be noted that the foregoing embodiments of this application describe a solution in a bandwidth (for example, a BWP) switching scenario. However, the embodiments of this application are not limited thereto. The embodiments of this application may be extended to another scenario, for example, may be extended to a carrier switching scenario. Therefore, the BWP in the foregoing embodiments may be replaced with a carrier (carrier component, CC), to extend to the carrier switching scenario or a carrier aggregation scenario. The BWP in the foregoing embodiments may alternatively be replaced with CC+BWP, to extend to a scenario in which there are a plurality of carriers and each carrier has a plurality of BWPs. The BWP in the foregoing embodiments may alternatively be replaced with a cell and/or a transmission point+CC+BWP, to extend to a scenario in which coordinated transmission is performed by a plurality of cells and/or transmission points.

In addition, it should be noted that the foregoing embodiments of this application describe sending of the beam failure recovery request by using the RACH. However, the embodiments of this application are not limited thereto, and the embodiments of this application may be extended to another scenario, for example, may be extended to sending the beam failure recovery request through an uplink control channel or an uplink data channel. Therefore, the RACH in the foregoing embodiments may be replaced with the uplink control channel or the uplink data channel.

A person skilled in the art may clearly understand that for ease of description, various numbers such as "first" and "second" in this application are only for distinguishing, and are not intended to limit the embodiments of this application.

It should be understood that the foregoing examples in FIG. 1 to FIG. 8 are merely intended to help a person skilled in the art understand the embodiments of this application, but are not intended to limit the embodiments of this application to a specific value or a specific scenario in the examples. A person skilled in the art apparently can make various equivalent modifications or changes according to the examples shown in FIG. 1 to FIG. 8, and such modifications or changes also fall within the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the method in the embodiments of this application with reference to FIG. 1 to FIG. 8. The following describes the communications apparatus in the embodiments of this application with reference to FIG. 9 to FIG. 12.

Figure 9:
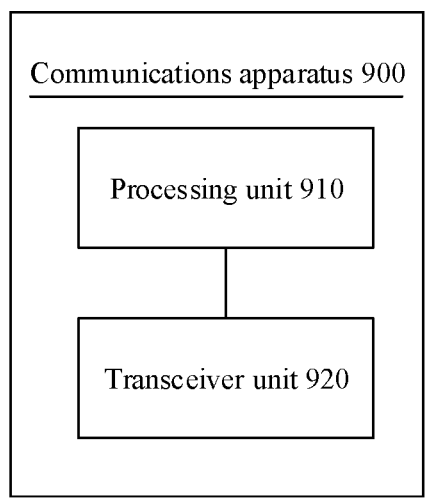
FIG. 9 is a schematic block diagram of a communications apparatus according to this application.

FIG. 9 is a schematic structural diagram of a communications apparatus 900 according to an embodiment of this application. The communications apparatus 900 may include:

a processing unit 910 and a transceiver unit 920.

Specifically, the processing unit is configured to: in a process in which beam failure recovery is performed in a first bandwidth, determine that an operating bandwidth needs to be switched from the first bandwidth to a second bandwidth; and switch from the first bandwidth to the second bandwidth according to a preset policy.

Optionally, the transceiver unit is configured to determine, based on bandwidth switching indication information received in the process of performing beam failure recovery in the first bandwidth, that the operating bandwidth is switched from the first bandwidth to the second bandwidth.

Optionally, the transceiver unit is configured to determine, based on pre-obtained bandwidth switching indication information, that the operating bandwidth needs to be switched from the first bandwidth to the second bandwidth in the process of performing beam failure recovery in the first bandwidth.

The processing unit is specifically configured to determine, based on bandwidth switching indication information, that the operating bandwidth needs to be switched from the first bandwidth to the second bandwidth in the process of beam failure recovery in the first bandwidth.

Optionally, the processing unit is specifically configured to switch from the first bandwidth to the second bandwidth after performing the process of beam failure recovery in the first bandwidth; or the processing unit is specifically configured to: stop the process of beam failure recovery in the first bandwidth, and switch from the first bandwidth to the second bandwidth.

Optionally, the processing unit is specifically configured to switch from the first bandwidth to the second bandwidth based on configurations of control channels of the first bandwidth and the second bandwidth.

Optionally, when the configurations of the control channels of the first bandwidth and the second bandwidth are different, the processing unit is specifically configured to: stop the process of beam failure recovery in the first bandwidth, and switch from the first bandwidth to the second bandwidth; or when the configurations of the control channels of the first bandwidth and the second bandwidth are the same, the processing unit is specifically configured to: switch from the first bandwidth to the second bandwidth, and continue to perform, in the second bandwidth, the process of beam failure recovery in the first bandwidth.

Optionally, that the configurations of the control channels of the first bandwidth and the second bandwidth are the same means that beams of the control channels of the first bandwidth and the second bandwidth are the same.

Optionally, after detecting one BFI in the first bandwidth, the processing unit determines that the operating bandwidth needs to be switched from the first bandwidth to the second bandwidth; and the processing unit is specifically configured to: maintain an overall time window for beam failure recovery in the first bandwidth, and a first counter and/or a first time window for determining a beam failure, and continue to perform a process of beam failure detection in the second bandwidth.

Optionally, after detecting a beam failure in the first bandwidth, the processing unit determines that the operating bandwidth needs to be switched from the first bandwidth to the second bandwidth; and the processing unit is specifically configured to: maintain an overall time window for beam failure recovery in the first bandwidth, and perform at least one of the following actions:

starting to perform a process of discovering an available candidate beam in the second bandwidth;

sending a beam failure recovery request; and monitoring a process in which a network device responds to the beam failure recovery request.

Optionally, a failed beam in the first bandwidth is an available beam in the second bandwidth; and the processing unit is specifically configured to perform the process of discovering an available candidate beam in a first subset of a candidate beam set in the second bandwidth, where the first subset includes a beam other than the failed beam in the candidate beam set in the second bandwidth.

Optionally, after determining an available beam in the first bandwidth, the processing unit determines that the operating bandwidth needs to be switched from the first bandwidth to the second bandwidth; and the processing unit is specifically configured to: maintain an overall time window for beam failure recovery in the first bandwidth, and perform at least one of the following actions:

sending, based on the available beam in the first bandwidth, a beam recovery request, and monitoring a response of a network device to the beam failure recovery request; and determining an available beam in the second bandwidth, and sending, based on the available beam in the second bandwidth, the beam recovery request, and monitoring the response of the network device to the beam failure recovery request.

Optionally, after sending a beam failure recovery request BFRQ in the first bandwidth, the processing unit determines that the operating bandwidth needs to be switched from the first bandwidth to the second bandwidth; and the processing unit is specifically configured to: maintain an overall time window for beam failure recovery in the first bandwidth and a counter for determining a quantity of BFRQ retransmissions, and perform at least one of the following actions:

sending, based on an available beam in the first bandwidth, the beam recovery request, and monitoring a response of a network device to the beam failure recovery request; and determining an available beam in the second bandwidth, and sending, based on the available beam in the second bandwidth, the beam recovery request, and monitoring the response of the network device to the beam failure recovery request.

Optionally, after starting to detect a response to a BFRQ in the first bandwidth, the processing unit determines that the operating bandwidth needs to be switched from the first bandwidth to the second bandwidth; and the processing unit is specifically configured to: maintain an overall time window for beam failure recovery in the first bandwidth and a counter for determining a quantity of BFRQ retransmissions, and perform at least one of the following actions:

monitoring, based on an available beam in the first bandwidth, a response of a network device to the beam failure recovery request;

sending, based on the available beam in the first bandwidth, the beam recovery request, and monitoring the response of the network device to the beam failure recovery request; and determining an available beam in the second bandwidth, and sending, by the terminal device based on the available beam in the second bandwidth, the beam recovery request, and monitoring the response of the network device to the beam failure recovery request.

Optionally, the available beam in the second bandwidth is the same as the available beam in the first bandwidth; or the available beam in the second bandwidth and the available beam in the first bandwidth satisfy a QCL relationship; or the available beam in the second bandwidth is obtained by the terminal device through measurement in the second bandwidth.

Optionally, the communications apparatus further includes:

a transceiver unit, configured to obtain configuration information, where the configuration information is used to configure at least one of the following information:

a QCL relationship between a downlink signal and a synchronization signal/broadcast channel block SSB that are cross-bandwidth;

a configuration in which candidate beams in one bandwidth include beams in a plurality of bandwidths;

an association relationship between cross-bandwidth reference signals;

an association relationship between an uplink resource and a reference signal of a candidate beam that are cross-bandwidth;

an association relationship between cross-bandwidth uplink and downlink beams; and an association relationship between uplink and downlink bandwidths.

The communications apparatus 900 provided in this application corresponds to the process performed by the terminal device in the method embodiment in FIG. 4. For functions of the units/modules in the communications apparatus, refer to the foregoing descriptions of the method embodiment in FIG. 4. Details are not described herein again.

Optionally, the communications apparatus 900 in this embodiment of this application may further correspond to the process performed by the terminal device in FIG. 5 to FIG. 8. For functions of the units/modules in the communications apparatus, refer to the foregoing descriptions of the method embodiments in FIG. 5 to FIG. 8. Details are not described herein again.

This embodiment of this application provides a solution of switching the operating bandwidth in the process of performing beam failure recovery in the operating bandwidth, thereby resolving a problem in the prior art.

It should be understood that, the communications apparatus in FIG. 9 may be a terminal device, or may be a chip or an integrated circuit installed in a terminal device.

Figure 10:
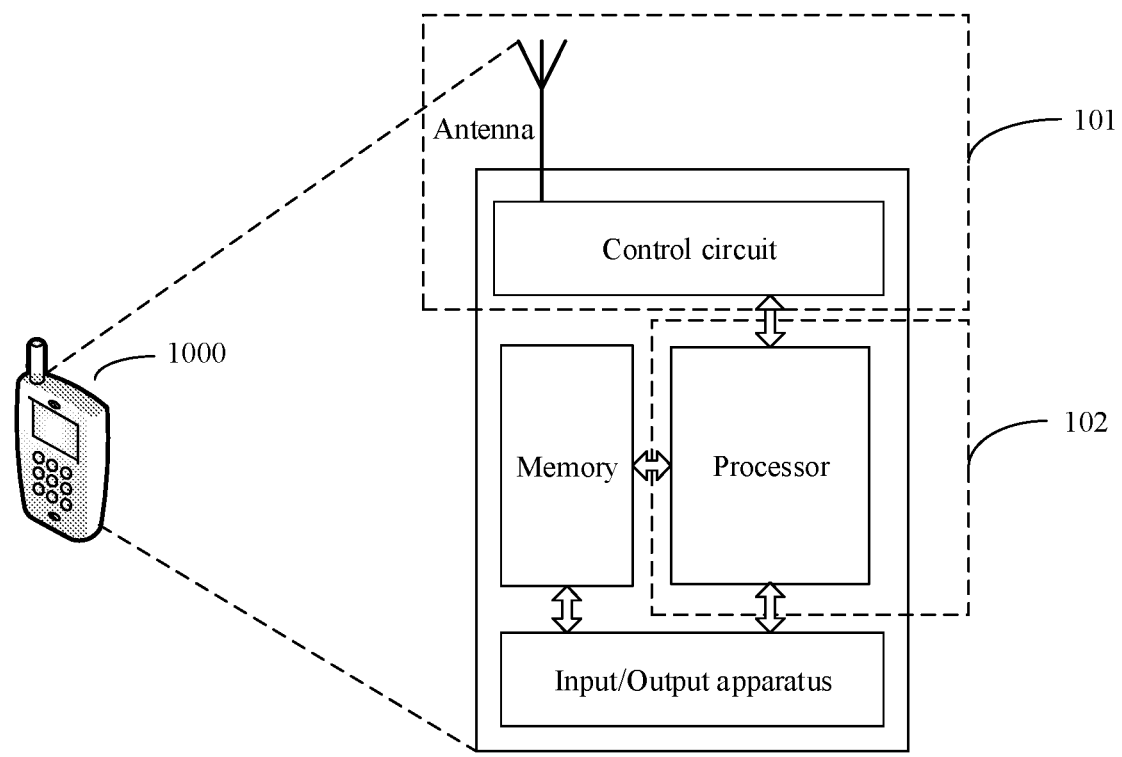
FIG. 10 is a schematic block diagram of a terminal device according to this application.

For example, the communications apparatus is a terminal device. FIG. 10 is a schematic structural diagram of a terminal device according to an embodiment of this application. For ease of understanding and illustration, in FIG. 10, for example, the terminal device is a mobile phone. FIG. 10 shows only main components of the terminal device. As shown in FIG. 10, a terminal device 1000 includes a processor, a memory, a control circuit, an antenna, and an input/output apparatus. The processor is mainly configured to process a communications protocol and communication data, control the entire terminal device, execute a software program, and process data of the software program, for example, configured to support the terminal device in performing the actions described in the foregoing method embodiments. The memory is mainly configured to store the software program and the data. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. Functions of the baseband processor and the central processing unit may be integrated into the processor in FIG. 10. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a software program form. The processor executes the software program to implement a baseband processing function.

In this embodiment of this application, an antenna and a control circuit that have receiving and sending functions may be considered as a transceiver unit 101 of the terminal device 1000, for example, configured to support the terminal device in performing the receiving and sending functions performed by the terminal device in FIG. 9. A processor having a processing function is considered as a processing unit 102 of the terminal device 1000, and corresponds to the processing unit 910 in FIG. 9. As shown in FIG. 10, the terminal device 1000 includes the transceiver unit 101 and the processing unit 102. The transceiver unit may also be referred to as a transceiver, a transceiver machine, a transceiver apparatus, or the like. The transceiver unit corresponds to the transceiver unit 920 in FIG. 9. Optionally, a device configured to implement the receiving function in the transceiver unit 101 may be considered as a receiving unit, and a device configured to implement the sending function in the transceiver unit 101 may be considered as a sending unit. In other words, the transceiver unit 101 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processing unit 102 may be configured to execute an instruction stored in the memory, to control the transceiver unit 101 to receive a signal and/or send a signal to complete a function of the terminal device in the foregoing method embodiments. In an implementation, it may be considered that the functions of the transceiver unit 101 are implemented by using a transceiver circuit or a transceiver-dedicated chip.

It should be understood that, the terminal device 1000 shown in FIG. 10 can implement processes related to the terminal device in the method embodiments in FIG. 4 to FIG. 8. The operations and/or the functions of the modules in the terminal device 1000 are intended to implement corresponding procedures in the foregoing method embodiments. For details, refer to the descriptions in the foregoing method embodiments. To avoid repetition, detailed descriptions are properly omitted herein.

Figure 11:
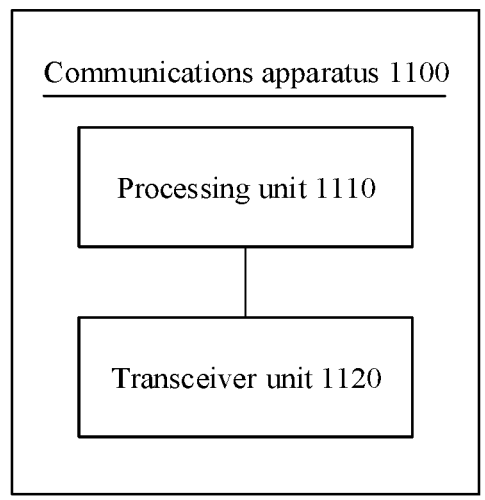
FIG. 11 is a schematic block diagram of another communications apparatus according to this application.

FIG. 11 is a schematic structural diagram of a communications apparatus 1100 according to an embodiment of this application. The apparatus 1100 may include:

a processing unit 1110 and a transceiver unit 1120.

Specifically, the processing unit is configured to generate configuration information, where the configuration information is used by a terminal device to perform operating bandwidth switching and/or beam failure recovery; and the transceiver unit is configured to send the configuration information, where the configuration information is used to configure at least one of the following information:

a QCL relationship between a downlink signal and a synchronization signal/broadcast channel block SSB that are cross-bandwidth;

a configuration in which candidate beams in one bandwidth include beams in a plurality of bandwidths;

an association relationship between cross-bandwidth reference signals;

an association relationship between an uplink resource and a reference signal of a candidate beam that are cross-bandwidth;

an association relationship between cross-bandwidth uplink and downlink beams; and an association relationship between uplink and downlink bandwidths.

The communications apparatus provided in this application corresponds to the process performed by the network device in the method embodiments in FIG. 4 to FIG. 9. For functions of the units/modules in the communications apparatus, refer to the foregoing descriptions. Details are not described herein again.

In this embodiment of this application, a network device sends the configuration information to the terminal device, so that the terminal device switches, based on the configuration information, an operating bandwidth in the process of performing beam failure recovery in the operating bandwidth, thereby resolving a problem in the prior art.

It should be understood that, the communications apparatus in FIG. 11 may be a network device, or may be a chip or an integrated circuit installed in a network device.

Figure 12:
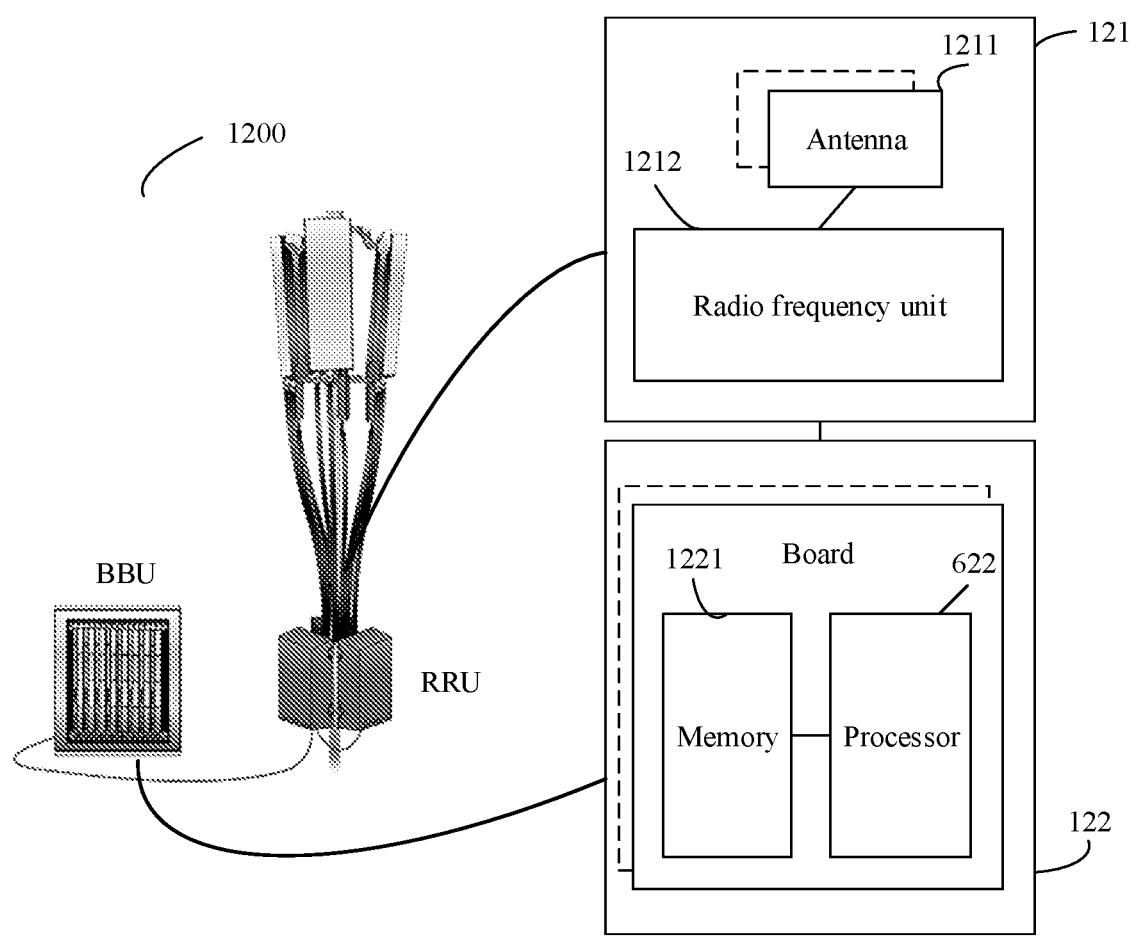
FIG. 12 is a schematic block diagram of a network device according to this application.

For example, the communications apparatus is a network device. FIG. 12 is a schematic structural diagram of a network device 1200 according to an embodiment of this application. For example, FIG. 12 may be a schematic structural diagram of a base station. As shown in FIG. 12, the network device 1200 may be applied to the system shown in FIG. 1, and performs functions of the network device in the foregoing method embodiments.

The network device 1200 may include one or more radio frequency units, for example, a remote radio unit (RRU) 121 and one or more baseband units (BBUs) (which may also be referred to as a digital unit (DU)) 122. The RRU 121 may be referred to as a transceiver unit 121, and corresponds to the transceiver unit 1120 in FIG. 11. Optionally, the transceiver unit may be further referred to as a transceiver machine, a transceiver circuit, a transceiver, or the like, and may include at least one antenna 1211 and a radio frequency unit 1212. The RRU 121 part is mainly configured to receive and send a radio frequency signal and perform conversion between a radio frequency signal and a baseband signal, for example, configured to send precoding matrix information to a terminal device. The BBU 122 part is mainly configured to perform baseband processing, control the base station, and the like. The RRU 121 and the BBU 122 may be physically disposed together, or may be physically disposed separated, namely, a distributed base station.

The BBU 122 is a control center of the base station, or may be referred to as a processing unit 122. The BBU 122 may correspond to the processing unit 1110 in FIG. 11, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments.

In an example, the BBU 122 may include one or more boards, and a plurality of boards may jointly support a radio access network (for example, an LTE network) having single access standard, or may separately support radio access networks (for example, an LTE network, a 5G network, or another network) having different access standards. The BBU 122 further includes a memory 1221 and a processor 1222. The memory 1221 is configured to store a necessary instruction and necessary data. The processor 1222 is configured to control the base station to perform a necessary action, for example, is configured to control the base station to perform an operation procedure related to the network device in the foregoing method embodiments. The memory 1221 and the processor 1222 may serve one or more boards. In other words, a memory and a processor may be disposed on each board. Alternatively, a plurality of boards may share a same memory and a same processor. In addition, a necessary circuit may further be disposed on each board.

It should be understood that, the network device 1200 shown in FIG. 12 can implement processes related to the network device in the method embodiment in FIG. 8 or FIG. 9. The operations and/or the functions of the modules in the network device 1200 are intended to implement corresponding procedures in the foregoing method embodiments. For details, refer to the descriptions in the foregoing method embodiments. To avoid repetition, detailed descriptions are properly omitted herein.

An embodiment of this application further provides a processing apparatus, including a processor and an interface, where the processor is configured to perform the communication method in any one of the foregoing method embodiments.

It should be understood that, the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller (micro controller unit, MCU), a programmable controller (programmable logic device, PLD), or another integrated chip.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be noted that, the processor in this embodiment of this application may be an integrated circuit chip, and has a signal processing capability. In an implementation process, steps in the foregoing method embodiments can be implemented by using a hardware integrated logic circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and the logical block diagrams disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example description but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and the method described in this specification is intended to include but is not limited to these memories and any other memory of a suitable type.

An embodiment of this application further provides a communications system, including the foregoing network device and terminal device.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It should be understood that, although the foregoing shows a communication method in downlink transmission in a communications system, this application is not limited to this. Optionally, a solution similar to that in the foregoing description may also be used in uplink transmission. To avoid repetition, details are not described again herein.

The network device and the terminal device in the foregoing apparatus embodiments completely correspond to the network device and the terminal device in the method embodiments. A corresponding module or unit performs a corresponding step. For example, a sending module (a transmitter) performs a sending step in the method embodiment, a receiving module (a receiver) performs a receiving step in the method embodiment, and other steps than sending and receiving may be performed by a processing module (a processor). For a function of a specific module, refer to a corresponding method embodiment. The sending module and the receiving module may form a transceiver module, and the transmitter and the receiver may form a transceiver to jointly implement receiving and sending functions. There may be one or more processors.

In this application, "at least one" means one or more, and "a plurality of" means two or more. The term "and/or" describes an association relationship between associated objects and may indicate three relationships. For example, A and/or B may indicate the following cases:

Only A exists, both A and B exist, and only B exists, where A and B may be singular or plural. The character "/" generally indicates an "or" relationship between the associated objects. "At least one (one piece) of the following" or a similar expression thereof refers to any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be further understood that, the first, second, third, fourth, and various numbers included in this specification are merely distinguished for convenient description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
in a process in which a terminal device performs beam failure recovery in a first bandwidth, determining, by the terminal device, that an operating bandwidth needs to be switched from the first bandwidth to a second bandwidth; and
switching, by the terminal device, from the first bandwidth to the second bandwidth according to a preset policy,
wherein the switching, by the terminal device, from the first bandwidth to the second bandwidth according to a preset policy comprises:
switching, by the terminal device, from the first bandwidth to the second bandwidth based on configurations of control channels of the first bandwidth and the second bandwidth, and
wherein the switching, by the terminal device, from the first bandwidth to the second bandwidth based on configurations of control channels of the first bandwidth and the second bandwidth comprises:
when the configurations of the control channels of the first bandwidth and the second bandwidth are different, stopping, by the terminal device, the process of beam failure recovery in the first bandwidth, and switching from the first bandwidth to the second bandwidth; or
when the configurations of the control channels of the first bandwidth and the second bandwidth are the same, switching, by the terminal device, from the first bandwidth to the second bandwidth; and
continuing, by the terminal device, to perform, in the second bandwidth, the process of beam failure recovery.

2. The method according to claim 1, wherein
the switching, by the terminal device, from the first bandwidth to the second bandwidth according to the preset policy comprises:
switching, by the terminal device, from the first bandwidth to the second bandwidth after performing the process of beam failure recovery in the first bandwidth; or
the switching, by the terminal device, from the first bandwidth to the second bandwidth according to the preset policy comprises:
stopping, by the terminal device, the process of beam failure recovery in the first bandwidth, and switching from the first bandwidth to the second bandwidth.

3. The method according to claim 1, wherein
that the configurations of the control channels of the first bandwidth and the second bandwidth are the same includes that beams of the control channels of the first bandwidth and the second bandwidth are the same.

4. The method according to claim 1, wherein after detecting one beam failure instance (BFI) in the first bandwidth, the terminal device determines that the operating bandwidth needs to be switched from the first bandwidth to the second bandwidth; and
the continuing, by the terminal device, to perform, in the second bandwidth, the process of beam failure recovery comprises:
maintaining, by the terminal device, an overall time window for beam failure recovery in the first bandwidth, and a first counter and/or a first time window for determining a beam failure, and performing a process of beam failure detection in the second bandwidth.

5. The method according to claim 1, wherein after detecting a beam failure in the first bandwidth, the terminal device determines that the operating bandwidth needs to be switched from the first bandwidth to the second bandwidth; and
the continuing, by the terminal device, to perform, in the second bandwidth, the process of beam failure recovery comprises:
maintaining, by the terminal device, an overall time window for beam failure recovery in the first bandwidth, and performing at least one of the following actions:
starting to perform a process of discovering an available candidate beam in the second bandwidth;
sending a beam failure recovery request; and
monitoring a process in which a network device responds to the beam failure recovery request.

6. The method according to claim 1, wherein after determining an available beam in the first bandwidth, the terminal device determines that the operating bandwidth needs to be switched from the first bandwidth to the second bandwidth; and
the continuing, by the terminal device, to perform, in the second bandwidth, the process of beam failure recovery comprises: maintaining, by the terminal device, an overall time window for beam failure recovery in the first bandwidth, and performing at least one of the following actions:
sending, by the terminal device based on the available beam in the first bandwidth, a beam failure recovery request, and monitoring a response of a network device to the beam failure recovery request; and
determining, by the terminal device, an available beam in the second bandwidth, and sending, by the terminal device based on the available beam in the second bandwidth, the beam failure recovery request, and monitoring the response of the network device to the beam failure recovery request.

7. The method according to claim 1, wherein after sending a beam failure recovery request (BFRQ) in the first bandwidth, the terminal device determines that the operating bandwidth needs to be switched from the first bandwidth to the second bandwidth; and the continuing, by the terminal device, to perform, in the second bandwidth, the process of beam failure recovery comprises:

maintaining, by the terminal device, an overall time window for beam failure recovery in the first bandwidth and a counter for determining a quantity of BFRQ retransmissions, and performing at least one of the following actions:

sending, by the terminal device based on an available beam in the first bandwidth, the beam failure recovery request, and monitoring a response of a network device to the beam failure recovery request; and determining, by the terminal device, an available beam in the second bandwidth, and sending, by the terminal device based on the available beam in the second bandwidth, the beam failure recovery request, and monitoring the response of the network device to the beam failure recovery request.

8. The method according to claim 1, wherein after starting to detect a response to a beam failure recovery request (BFRQ) in the first bandwidth, the terminal device determines that the operating bandwidth needs to be switched from the first bandwidth to the second bandwidth; and the continuing, by the terminal device, to perform, in the second bandwidth, the process of beam failure recovery comprises:

maintaining, by the terminal device, an overall time window for beam failure recovery in the first bandwidth and a counter for determining a quantity of BFRQ retransmissions, and performing at least one of the following actions:

monitoring, by the terminal device based on an available beam in the first bandwidth, a response of a network device to the beam failure recovery request;

sending, by the terminal device based on the available beam in the first bandwidth, the beam failure recovery request, and monitoring the response of the network device to the beam failure recovery request; and determining, by the terminal device, an available beam in the second bandwidth, and sending, by the terminal device based on the available beam in the second bandwidth, the beam failure recovery request, and monitoring the response of the network device to the beam failure recovery request.

9. The method according to claim 1, wherein the method further comprises:

obtaining, by the terminal device, configuration information, wherein the configuration information is used to configure at least one of the following information:

a quasi-co-location (QCL) relationship between a downlink signal and a synchronization signal/broadcast channel block (SSB) that are cross-bandwidth;

a configuration in which candidate beams in one bandwidth comprise beams in a plurality of bandwidths;

an association relationship between cross-bandwidth reference signals;

an association relationship between an uplink resource and a reference signal of a candidate beam that are cross-bandwidth;

an association relationship between cross-bandwidth uplink and downlink beams; and an association relationship between uplink and downlink bandwidths.

10. A communications apparatus, comprising:

a processor, configured to: in a process in which beam failure recovery is performed in a first bandwidth, determine, that an operating bandwidth needs to be switched from the first bandwidth to a second bandwidth; and switch from the first bandwidth to the second bandwidth according to a preset policy, wherein the processor is configured to switch from the first bandwidth to the second bandwidth based on configurations of control channels of the first bandwidth and the second bandwidth, and wherein when the configurations of the control channels of the first bandwidth and the second bandwidth are different, the processor is configured to: stop the process of beam failure recovery in the first bandwidth, and switch from the first bandwidth to the second bandwidth; or when the configurations of the control channels of the first bandwidth and the second bandwidth are the same, the processor is configured to: switch from the first bandwidth to the second bandwidth, and continue to perform, in the second bandwidth, the process of beam failure recovery.

11. The communications apparatus according to claim 10, wherein the processor is configured to switch from the first bandwidth to the second bandwidth after performing the process of beam failure recovery in the first bandwidth; or the processor is configured to: stop the process of beam failure recovery in the first bandwidth, and switch from the first bandwidth to the second bandwidth.

12. The communications apparatus according to claim 10, wherein after detecting one beam failure instance (BFI) in the first bandwidth, the processor determines that the operating bandwidth needs to be switched from the first bandwidth to the second bandwidth; and the processor is configured to: maintain an overall time window for beam failure recovery in the first bandwidth, and a first counter and/or a first time window for determining a beam failure, and perform a process of beam failure detection in the second bandwidth.

13. The communications apparatus according to claim 10, wherein after detecting a beam failure in the first bandwidth, the processor determines that the operating bandwidth needs to be switched from the first bandwidth to the second bandwidth; and the processor is configured to: maintain an overall time window for beam failure recovery in the first bandwidth, and perform at least one of the following actions:

start to perform a process of discovering an available candidate beam in the second bandwidth;

send a beam failure recovery request; and monitor a process in which a network device responds to the beam failure recovery request.

14. The communications apparatus according to claim 10, wherein after determining an available beam in the first bandwidth, the processor determines that the operating bandwidth needs to be switched from the first bandwidth to the second bandwidth; and the processor is configured to: maintain an overall time window for beam failure recovery in the first bandwidth, and perform at least one of the following actions:

send, based on the available beam in the first bandwidth, a beam failure recovery request, and monitor a response of a network device to the beam failure recovery request; and determine an available beam in the second bandwidth, and sending, based on the available beam in the second bandwidth, the beam failure recovery request, and monitor the response of the network device to the beam failure recovery request.

15. The communications apparatus according to claim 10, wherein after sending a beam failure recovery request (BFRQ) in the first bandwidth, the processor determines that the operating bandwidth needs to be switched from the first bandwidth to the second bandwidth; and the processor is configured to: maintain an overall time window for beam failure recovery in the first bandwidth and a counter for determining a quantity of BFRQ retransmissions, and perform at least one of the following actions:

send, based on an available beam in the first bandwidth, the beam failure recovery request, and monitor a response of a network device to the beam failure recovery request; and determine an available beam in the second bandwidth, and send, based on the available beam in the second bandwidth, the beam failure recovery request, and monitor the response of the network device to the beam failure recovery request.

16. The communications apparatus according to claim 10, wherein after starting to detect a response to a beam failure recovery request (BFRQ) in the first bandwidth, the processor determines that the operating bandwidth needs to be switched from the first bandwidth to the second bandwidth; and the processor is configured to: maintain an overall time window for beam failure recovery in the first bandwidth and a counter for determining a quantity of BFRQ retransmissions, and perform at least one of the following actions:

monitor, based on an available beam in the first bandwidth, a response of a network device to the beam failure recovery request;

send, based on the available beam in the first bandwidth, the beam failure recovery request, and monitor the response of the network device to the beam failure recovery request; and determine an available beam in the second bandwidth, and send, based on the available beam in the second bandwidth, the beam failure recovery request, and monitor the response of the network device to the beam failure recovery request.

* * * * *